(12) United States Patent
Ertas et al.

(10) Patent No.: US 12,385,443 B2
(45) Date of Patent: *Aug. 12, 2025

(54) MOUNTING ASSEMBLY FOR A GEARBOX ASSEMBLY

(71) Applicants: General Electric Company, Evendale, OH (US); GE Avio S.r.l., Rivalta di Torino (IT)

(72) Inventors: Bugra H. Ertas, Niskayuna, NY (US); Ravindra Shankar Ganiger, Bengaluru (IN); Andrea Piazza, Turin (IT); Brandon W. Miller, Middletown, OH (US)

(73) Assignees: GENERAL ELECTRIC COMPANY, Evendale, OH (US); GE AVIO S.R.L., Rivalta di Torino (IT)

( * ) Notice: Subject to any disclaimer, the term of this patent is extended or adjusted under 35 U.S.C. 154(b) by 0 days.

This patent is subject to a terminal disclaimer.

(21) Appl. No.: 18/913,330

(22) Filed: Oct. 11, 2024

(65) Prior Publication Data

US 2025/0035052 A1 Jan. 30, 2025

Related U.S. Application Data

(63) Continuation-in-part of application No. 17/929,105, filed on Sep. 1, 2022, now Pat. No. 12,203,418.

(30) Foreign Application Priority Data

Apr. 25, 2022 (IN) .............................. 202211024200

(51) Int. Cl.
F02C 7/36 (2006.01)

(52) U.S. Cl.
CPC ............ *F02C 7/36* (2013.01); *F05D 2220/36* (2013.01); *F05D 2240/14* (2013.01); *F05D 2260/213* (2013.01); *F05D 2260/4031* (2013.01)

(58) Field of Classification Search
CPC .......... F16H 57/025; F16H 57/08; F02C 7/36; F02C 7/14; F05D 2220/36; F05D 2240/14;
(Continued)

(56) References Cited

U.S. PATENT DOCUMENTS 5,433,674 A 7/1995 Sheridan et al.
8,297,916 B1 10/2012 McCune et al.
(Continued)

FOREIGN PATENT DOCUMENTS

CN 108302162 A 7/2018
EP 3956620 A1 2/2022
(Continued)

*Primary Examiner* — Topaz L. Elliott
(74) *Attorney, Agent, or Firm* — Venable LLP; Peter T. Hrubiec; Michele V. Frank

(57) ABSTRACT

A mounting assembly for a gearbox assembly of a gas turbine engine includes at least one mounting member configured to mount a gear of the gearbox assembly to a component of the gas turbine engine, the at least one mounting member characterized by a lateral impedance parameter, a bending impedance parameter, and a torsional impedance parameter. A gas turbine engine includes the mounting assembly. The at least one mounting member may be a flex mount, a fan frame, or a flex coupling. The gas turbine engine also includes a heat exchanger including an inner peripheral wall and an outer peripheral wall extending between an inlet and an outlet. The inner peripheral wall and the outer peripheral wall define a flow channel therebetween. The heat exchanger includes a plurality of fins disposed in (Continued)

the flow channel and dividing the flow channel into a plurality of flow passages.

20 Claims, 11 Drawing Sheets

(58) Field of Classification Search
CPC ....... F05D 2260/213; F05D 2260/4031; F02K 3/115
See application file for complete search history.

(56) References Cited

U.S. PATENT DOCUMENTS

| | | |
|---|---|---|
| 8,297,917 B1 | 10/2012 | McCune et al. |
| 8,747,055 B2 | 6/2014 | McCune et al. |
| 8,770,922 B2 | 7/2014 | McCune et al. |
| 8,814,503 B2 | 8/2014 | McCune et al. |
| 8,899,915 B2 | 12/2014 | McCune et al. |
| 9,631,558 B2 | 4/2017 | McCune et al. |
| 10,301,968 B2 | 5/2019 | McCune et al. |
| 10,392,119 B2 | 8/2019 | Niergarth et al. |
| 10,450,956 B2 | 10/2019 | Schmitz |
| 10,830,141 B2 | 11/2020 | Gerstler et al. |
| 11,021,997 B2 | 6/2021 | McCune et al. |
| 11,098,954 B2 | 8/2021 | Fuller |
| 11,262,144 B2 | 3/2022 | Breeze-Stringfellow et al. |
| 11,549,438 B2 | 1/2023 | Bradbrook et al. |
| 11,754,342 B2 | 9/2023 | Levisse et al. |
| 2007/0225111 A1 | 9/2007 | Duong et al. |
| 2010/0105516 A1 | 4/2010 | Sheridan et al. |
| 2013/0067931 A1 | 3/2013 | Hindle et al. |
| 2013/0287575 A1 | 10/2013 | McCune et al. |
| 2015/0308351 A1 | 10/2015 | Sheridan |
| 2017/0122426 A1 | 5/2017 | Miller et al. |
| 2019/0120363 A1 | 4/2019 | Grubba |
| 2019/0204010 A1 | 7/2019 | Breeze-Stringfellow et al. |
| 2020/0003128 A1 | 1/2020 | Maguire et al. |
| 2020/0088106 A1 | 3/2020 | Miller et al. |
| 2021/0172381 A1 | 6/2021 | Spruce |
| 2023/0212987 A1 | 7/2023 | Payyoor et al. |
| 2023/0235715 A1 | 7/2023 | McCune et al. |

FOREIGN PATENT DOCUMENTS

| | | |
|---|---|---|
| FR | 3127024 A1 | 3/2023 |
| FR | 3127025 A1 | 3/2023 |
| FR | 3129436 A1 | 5/2023 |
| FR | 3129690 A1 | 6/2023 |
| FR | 3130747 A1 | 6/2023 |
| FR | 3130875 A1 | 6/2023 |
| JP | S57192798 A | 11/1982 |
| JP | 2004316474 A | 11/2004 |
| JP | 4192661 B2 | 12/2008 |
| WO | 2023037074 A1 | 3/2023 |
| WO | 2023037075 A1 | 3/2023 |

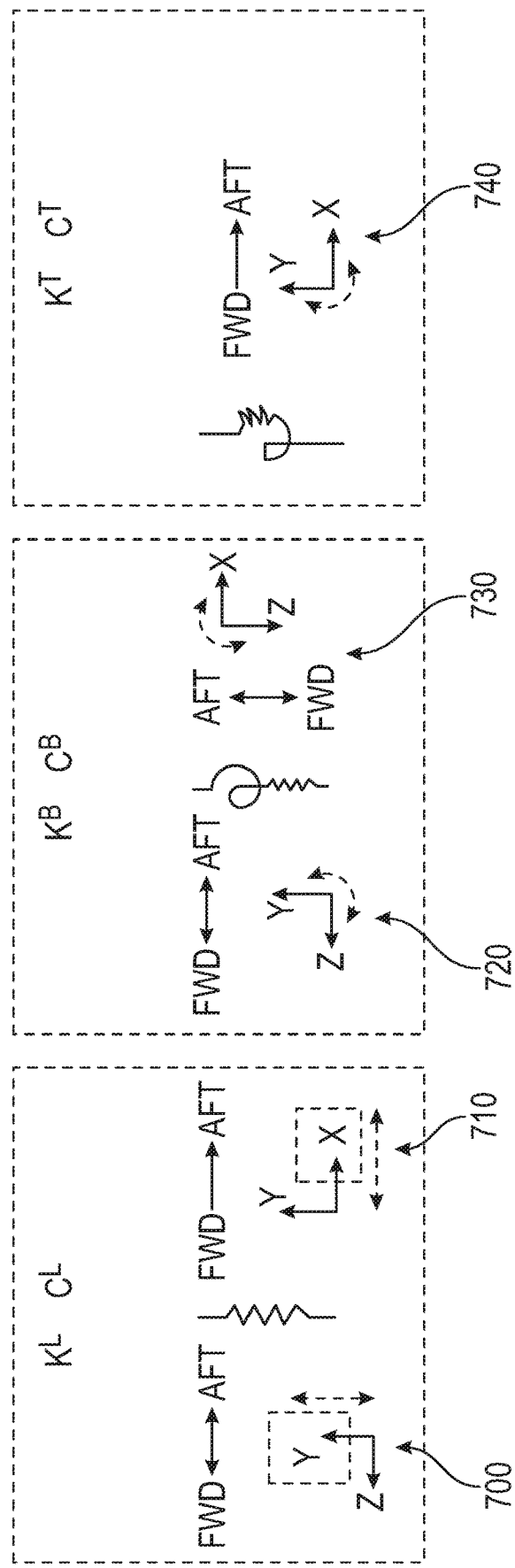

MOUNTING ASSEMBLY FOR A GEARBOX ASSEMBLY

CROSS REFERENCE TO RELATED APPLICATIONS

The present application is a continuation-in-part application of U.S. patent application Ser. No. 17/929,105, filed on Sep. 1, 2022, which claims the benefit of Indian Patent Application No. 202211024200, filed on Apr. 25, 2022, the entire contents of which are incorporated by reference in their entireties.

TECHNICAL FIELD

The present disclosure relates to a mounting assembly for a gearbox assembly of a gas turbine engine. In particular, the present disclosure relates to at least one impedance parameter for a gearbox assembly mounting assembly for a gas turbine engine.

BACKGROUND

A gas turbine engine includes a fan driven by a turbine. A gearbox assembly is coupled between the fan and the turbine. The gearbox assembly provides a speed decrease between the turbine and the fan. The gearbox assembly is mounted to a static structure of the engine via one or more mounting members.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

FIG. 7A shows a schematic of the degrees of freedom of lateral stiffness, according to an embodiment of the present disclosure.

FIG. 7B shows a schematic of the degrees of freedom of bending stiffness, according to an embodiment of the present disclosure.

FIG. 7C shows a schematic of the degrees of freedom of torsional stiffness, according to an embodiment of the present disclosure.

DETAILED DESCRIPTION

Figure 1:
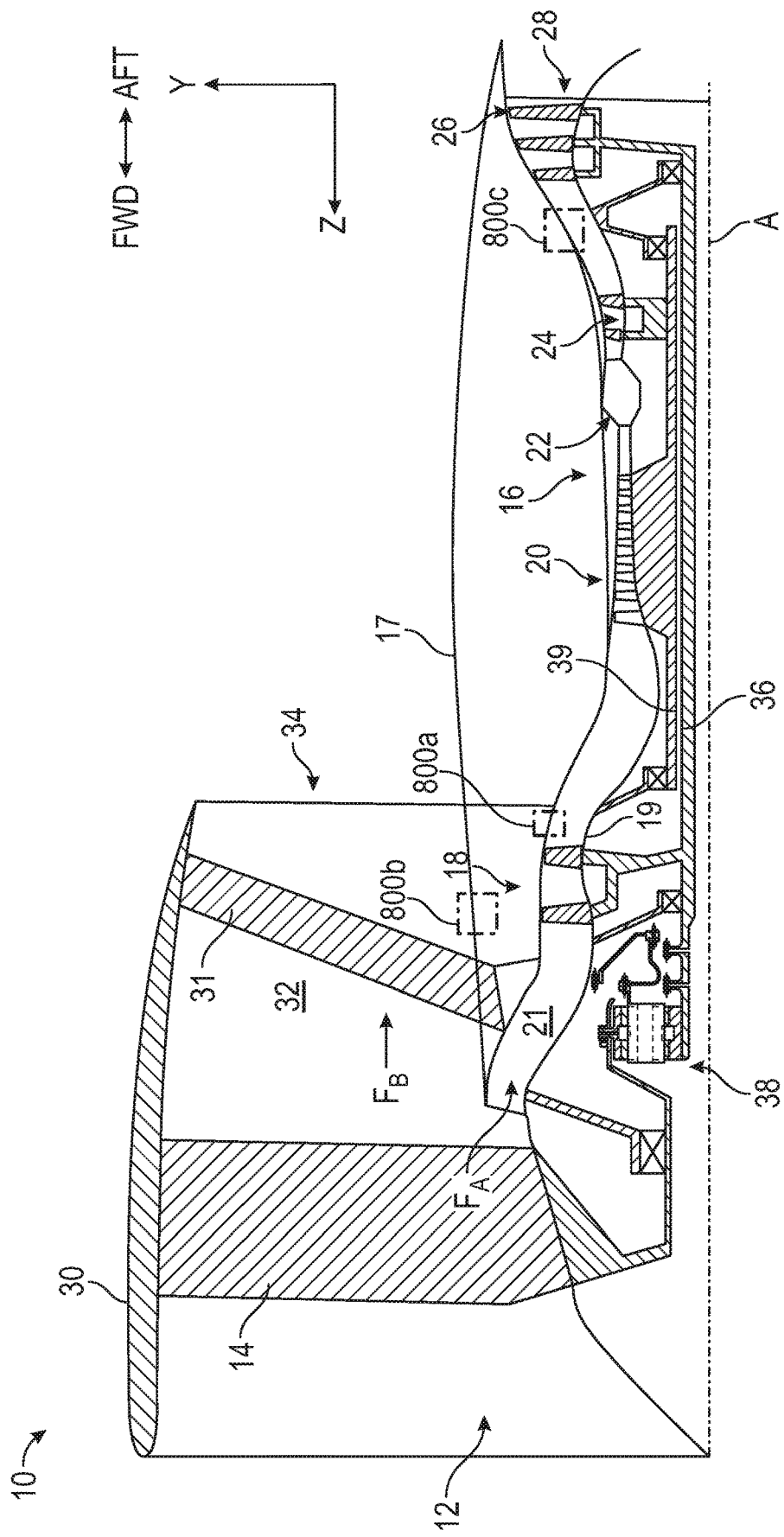
FIG. 1 shows a schematic, cross-sectional view of a gas turbine engine, taken along a centerline of the gas turbine engine, according to an embodiment of the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the present disclosure.

As used herein, the terms "first," "second," and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. More particularly, forward and aft are used herein with reference to a direction of travel of the vehicle and a direction of propulsive thrust of the gas turbine engine.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached," "connected," and the like, refer to both direct coupling, fixing, attaching, or connecting as well as indirect coupling, fixing, attaching, or connecting through one or more intermediate components or features, unless otherwise specified herein.

The singular forms "a," "an," and "the" include plural references unless the context clearly dictates otherwise.

The terms "lateral stiffness" and "lateral structural stiffness" are used interchangeably and refer to the stiffness of a component having degrees of freedom in the lateral and the radial directions. That is, the stiffness of a component in the radial direction (direction Y in FIGS. 1 and 7A) and the lateral direction (direction X in FIG. 7A; into and out of the page in FIG. 1). The lateral stiffness is defined as shown in FIG. 7A. The lateral stiffness is identified herein as $K^L$.

The terms "bending stiffness" and "bending structural stiffness" are used interchangeably and refer to the stiffness of a component having degrees of freedom in the pitch and the yaw directions. That is, the stiffness of a component in the pitch direction (about the Y and Z plane in FIG. 7B) and the yaw direction (about the Z and X plane in FIG. 7B). The bending stiffness is defined as shown in FIG. 7B. The bending stiffness is identified herein as $K^B$.

The term "casing" herein refers to the structure that defines an airflow path (e.g., wall of duct, or casing). A mounting to the casing may be a direct bolted connection or through a load bearing frame.

A "static structure" as herein referred means any structural part of an engine that is non-rotating.

The terms "torsional stiffness" and "torsional structural stiffness" are used interchangeably and refer to the stiffness of a component having degrees of freedom in the torsional or rotational direction about an engine centerline (about the X and Y plane in FIG. 7C, about the engine centerline). The torsional stiffness is defined as shown in FIG. 7C. The torsional stiffness herein is identified as $K^T$.

The term "lateral damping" refers to the structural damping of a component in the lateral direction at a frequency of vibration. The lateral damping is identified herein as $C^L$.

The term "bending damping" refers to the structural damping of a component in the bending direction at a frequency of vibration. The bending damping is identified herein as $C^B$.

The term "torsional damping" refers to the structural damping of a component in the torsional or rotational direction at a frequency of vibration. The torsional damping is identified herein as $C^T$.

Here and throughout the specification and claims, range limitations are combined and interchanged. Such ranges are identified and include all the sub-ranges contained therein unless context or language indicates otherwise. For example, all ranges disclosed herein are inclusive of the endpoints, and the endpoints are independently combinable with each other.

The loading of a gas turbine engine, while the engine is producing thrust, induces thrust reaction forces through the aircraft-engine mounting points. For example, the mount points to a wing pylon induce during a take-off and/or climb sequence a net bending moment about the pitch axis. The resulting deflections cause relative movement among, e.g., turbine shaft(s), mid-frame, engine casing, front frame, etc. These relative movements, occurring sometimes at different rates (depending on flight conditions) result in coupled loads among the supporting structure, engine frames, shafts, casing etc. This results in relative movements, bending, or shifting at different rates and to different degrees (depending on load paths, flexible/stiff joints, parts etc.). The bending of the engine also deforms the casing of the engine along its length. The degree to which components move relative to each other depends on how they are connecting to each other, the material used and the structural dynamic properties of the interconnected structure supporting the components. If these aspects of engine design are not fully taken into consideration, there may result misalignments resulting in pre-mature failure or wear of component parts, e.g., bearings, seals, etc.

One such component affected by the dynamic loading of the engine is a power gearbox, utilized to transfer power from a turbine shaft to a main fan. Such gearboxes may include a sun gear, a plurality of planet gears, and a ring gear. The sun gear meshes with the plurality of planet gears and the plurality of planet gears mesh with the ring gear. In operation, the gearbox transfers the torque transmitted from a turbine shaft operating at a first speed to a fan shaft rotating at a second, lower speed. For a planet configuration of the gearbox, the sun gear may be coupled to the mid-shaft of a lower pressure turbine rotating at the first speed. The planet gears, intermeshed with the sun gear, then transfer this torque to the fan shaft through a planet carrier. In a star configuration, a ring gear is coupled to the fan shaft. In either configuration, the gearbox is supported by, for example, a flex mount, a flex coupling, and a fan frame coupling.

The relative movements of the frames supporting the gearbox and input/output shafts for the gearbox, as a result of the aforementioned loading on the engine, can cause not insignificant relative movements among the moving parts of the power gearbox, i.e., the gears, carrier, ring etc. resulting in misalignments in the geartrain. This misalignment then causes distortions or eccentric loading, in particular, the torque loads are not uniformly resolved, or uniformly distributed among the gears. This results in edge loading and high stresses within the individual gears and the gearbox assembly, which may result in degradation of gear life, failure, and/or breakage of the gears.

As engines increase in thrust and power, the loading environments described become more challenging to accommodate while assuring sufficient life and durability of a gearbox assembly. The inventors, having a need to improve upon the existing support structure for power gearboxes to support mission requirements, designed several different configurations of gearbox supports to arrive at an improved design, better suited to handle the loads environment for particular flight conditions in different architectures, thereby extending life of parts in a gearbox and avoiding premature failure events.

FIG. 1 shows a schematic cross-sectional view of a gas turbine engine 10 taken along a center axis A that is a principal rotational axis. The gas turbine engine 10 includes an air intake 12 and a fan 14 that generates two airflows: a core airflow $F_A$ and a bypass airflow $F_B$. The gas turbine engine 10 includes an engine core 16 that receives the core airflow $F_A$. The engine core 16 includes a casing 17 that encircles, in axial flow series, a compressor section including a low-pressure compressor 18 and a high-pressure compressor 20, a combustion section 22, a turbine section including a high-pressure turbine 24 and a low-pressure turbine 26, and a core exhaust nozzle 28. The casing 17 generally defines a core flow passage 21 through which the core airflow $F_A$ flows. The core flow passage 21 is in fluid communication with at least one of the compressor section, the combustion section, or the turbine section. A nacelle 30, via an engine frame strut 31, surrounds the gas turbine engine 10 and may serve as an outlet guide vane. The nacelle 30 defines a bypass duct 32 and a bypass exhaust nozzle 34. The bypass airflow $F_B$ flows through the bypass duct 32. The fan 14 is coupled to and driven by the low-pressure turbine 26 via a low-pressure shaft 36 and a gearbox assembly 38.

In use, the core airflow $F_A$ is accelerated and compressed by the low-pressure compressor 18 and directed into the high-pressure compressor 20 where further compression takes place. The compressed air exhausted from the high-pressure compressor 20 is directed into the combustion section 22 and is mixed with fuel, and the fuel and air mixture is combusted. The resultant hot combustion products then expand through, and thereby drive, the high-pressure turbine 24 and the low-pressure turbine 26 before being exhausted through the core exhaust nozzle 28. This provides propulsive thrust. The high-pressure turbine 24 drives the high-pressure compressor 20 by a high-pressure shaft 39. The fan 14 generally provides the majority of the propulsive thrust. The gearbox assembly 38 is a reduction gearbox, power gearbox that delivers a torque from the low-pressure shaft 36 running at a first speed, to a fan shaft coupled to the fan 14 running at a second, slower speed.

Figure 2:
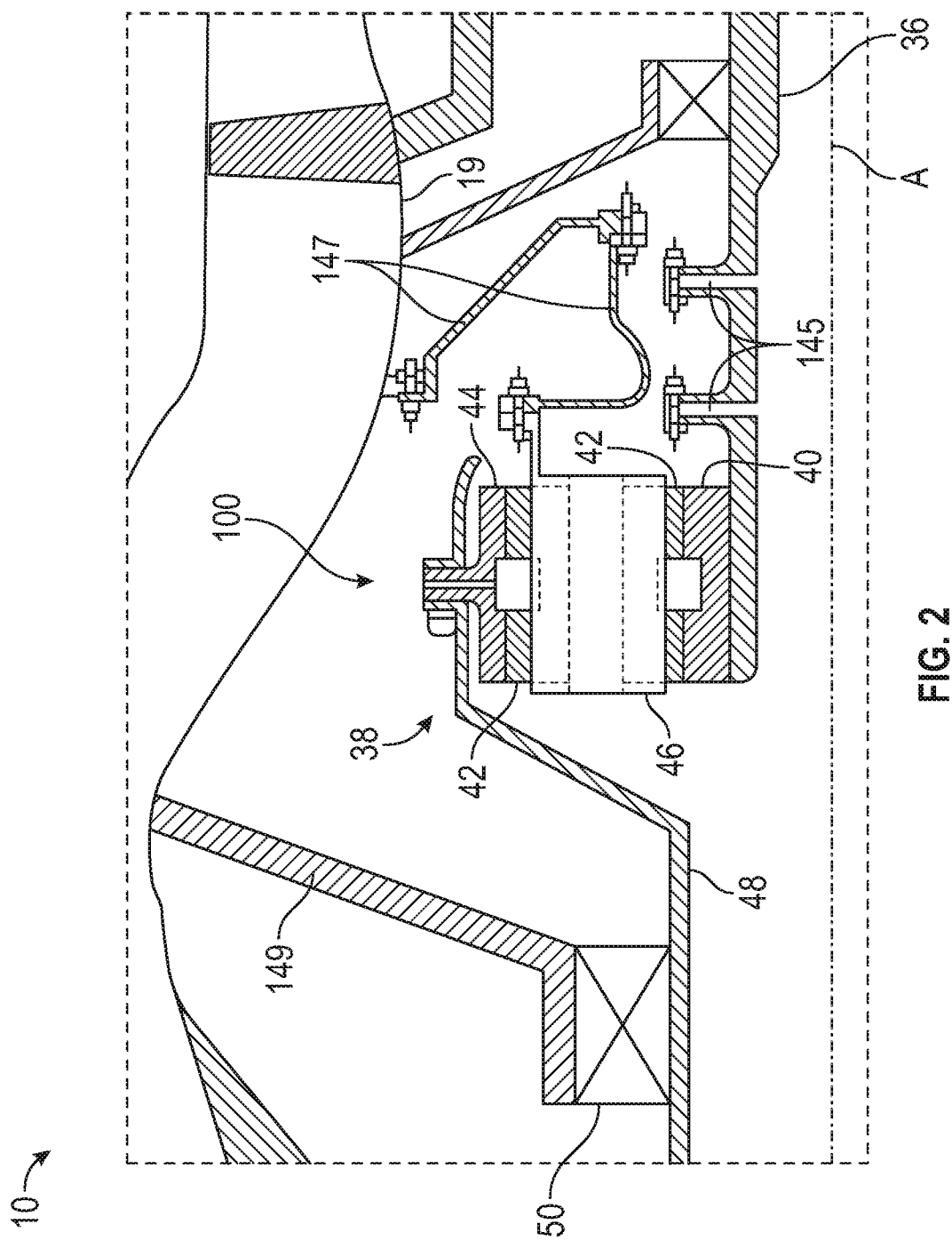
FIG. 2 shows an enlarged, schematic, cross-sectional view of a gearbox assembly of a gas turbine engine, taken along a centerline of the gas turbine engine, according to an embodiment of the present disclosure.
Figure 3:
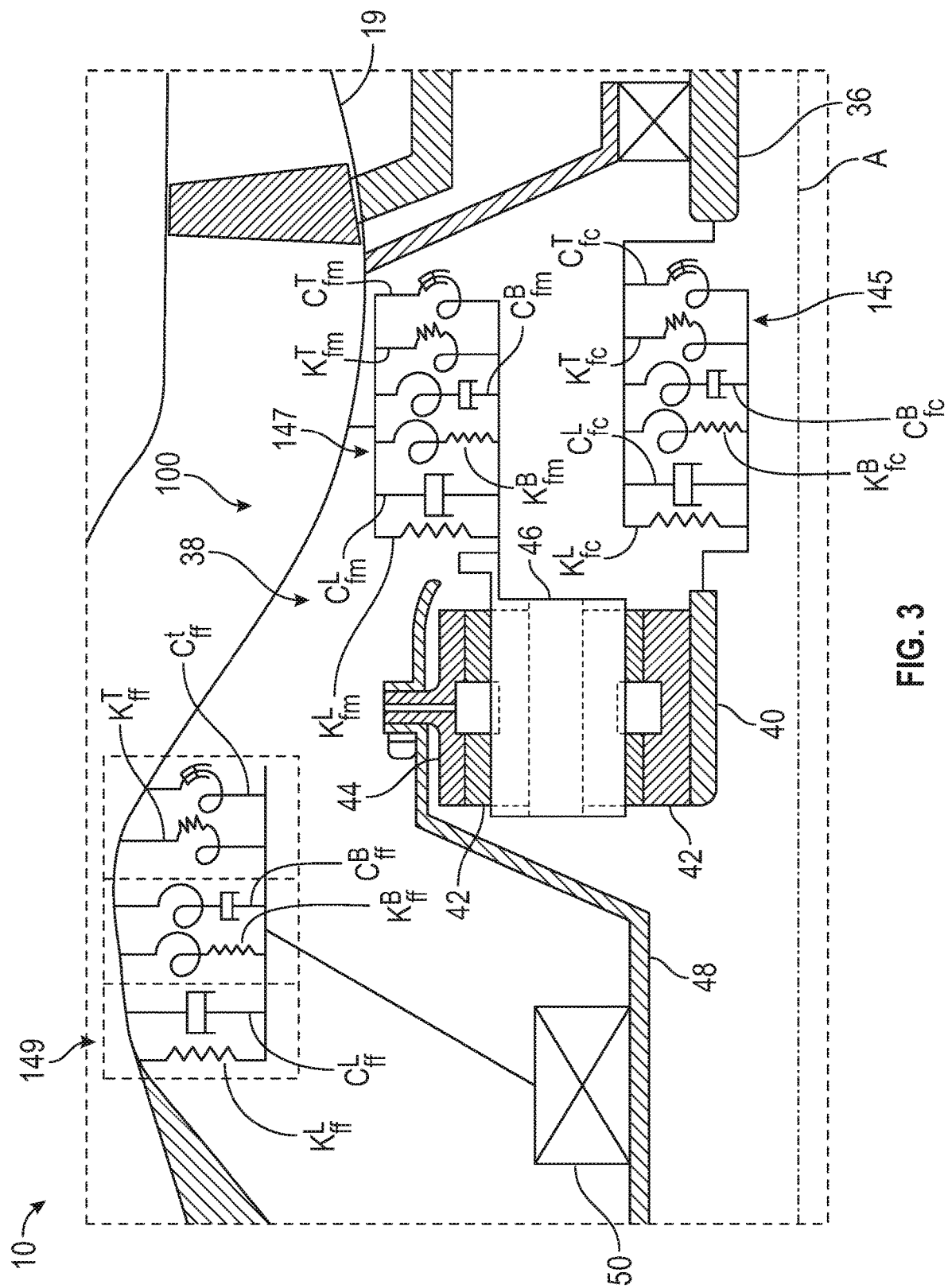
FIG. 3 shows a schematic, cross-sectional view of the gearbox assembly of FIG. 2, translated into a representative vibratory system.

FIGS. 2 and 3 illustrate enlarged, schematic side cross-sectional views of the gearbox assembly 38 of FIG. 1 with a mounting assembly 100. The mounting assembly 100 shown is that for a star configuration gearbox, described in more detail to follow. The gearbox assembly 38 includes a sun gear 40, a plurality of planet gears 42, and a ring gear 44. The low-pressure turbine 26 (FIG. 1) drives the low-pressure shaft 36, which is coupled to the sun gear 40 of the gearbox assembly 38. The sun gear 40 of the gearbox assembly 38 is coupled via a flex coupling 145 to the rotating low-pressure shaft 36.

Radially outwardly of the sun gear 40, and intermeshing therewith, is the plurality of planet gears 42 that are coupled together by a planet carrier 46. The planet carrier 46 of the gearbox assembly 38 is coupled, via a flex mount 147, to the engine static structure 19. The planet carrier 46 constrains the plurality of planet gears 42 while allowing each planet gear of the plurality of planet gears 42 to rotate about its own axis. Radially outwardly of the plurality of planet gears 42, and intermeshing therewith, is the ring gear 44, which is an annular ring gear 44. The ring gear 44 is coupled via a fan shaft 48 to the fan 14 (FIG. 1) in order to drive rotation of the fan 14 about the axis A. The fan shaft 48 is coupled to a fan frame 149 via a fan bearing 50. The fan frame 149 couples the rotating ring gear 44 of the gearbox assembly 38 and, thus, the rotating fan shaft 48, to the engine static structure 19. The flex coupling 145, the flex mount 147, and the fan frame 149 define the mounting assembly 100 for the gearbox assembly 38. As described herein, the flex coupling 145, the flex mount 147, and the fan frame 149 may be referred to as mounting members.

Although not depicted in FIGS. 2 and 3 for clarity, each of the sun gear 40, the plurality of planet gears 42, and the ring gear 44 includes teeth about their periphery to intermesh with the other gears. In the example of FIGS. 2 and 3, the gearbox assembly 38 is a star configuration. That is, the ring gear 44 rotates, while the planet carrier 46 is fixed and stationary. The planet carrier 46 constrains the plurality of planet gears 42 such that the plurality of planet gears 42 do not together rotate around the sun gear 40, while also enabling each planet gear of the plurality of planet gears 42 to rotate about its own axis. That is, since the plurality of planet gears 42 mesh with both the rotating ring gear 44 as well as the rotating sun gear 40, each of the plurality of planet gears 42 rotate about their own axes to drive the ring gear 44 to rotate about engine axis A (FIG. 1) due to the rotation of the sun gear 40. The rotation of the ring gear is 44 conveyed to the fan 14 (FIG. 1) through the fan shaft 48.

FIG. 3 illustrates the mounting assembly 100 of FIG. 2 translated into a representative vibratory system where each of the flex coupling 145, the flex mount 147, and the fan frame 149 are shown by representative structural properties of the members, the representative structural properties being the structural stiffness (K) and the damping (C) of the respective members of the mounting assembly 100. As shown, each of the flex coupling 145, the flex mount 147, and the fan frame 149 includes the representative structural properties (structural stiffness and damping) in each of the lateral direction, the bending direction, and the torsional direction.

For example, FIG. 3 represents the gearbox supporting structure in terms of structural properties characterizing the nature of the coupling between the gearbox and the flex coupling 145. The flex coupling 145 may be represented in terms of a flex coupling lateral stiffness $K_{fc}^{L}$, a flex coupling bending stiffness $K_{fc}^{B}$, a flex coupling torsional stiffness $K_{fc}^{T}$, a flex coupling lateral damping $C_{fc}^{L}$, a flex coupling bending damping $C_{fc}^{B}$, and a flex coupling torsional damping $C_{fc}^{T}$.

FIG. 3 represents the gearbox supporting structure in terms of structural properties characterizing the nature of the coupling between the gearbox and the flex mount 147. The flex mount 147 may be represented in terms of a flex mount lateral stiffness $K_{fm}^{L}$, a flex mount bending stiffness $K_{fm}^{B}$, a flex mount torsional stiffness $K_{fm}^{T}$, a flex mount lateral damping $C_{fm}^{L}$, a flex mount bending damping $C_{fm}^{B}$, and a flex mount torsional damping $C_{fm}^{T}$.

FIG. 3 represents the gearbox supporting structure in terms of structural properties characterizing the nature of the coupling between the gearbox and the fan frame 149. The fan frame 149 may be represented in terms of fan frame lateral stiffness $K_{ff}^{L}$, a fan frame bending stiffness $K_{ff}^{B}$, a fan frame torsional stiffness $K_{ff}^{T}$, a fan frame lateral damping $C_{ff}^{L}$, a fan frame bending damping $C_{ff}^{B}$, and a fan frame torsional damping $C_{ff}^{T}$.

Figure 4:
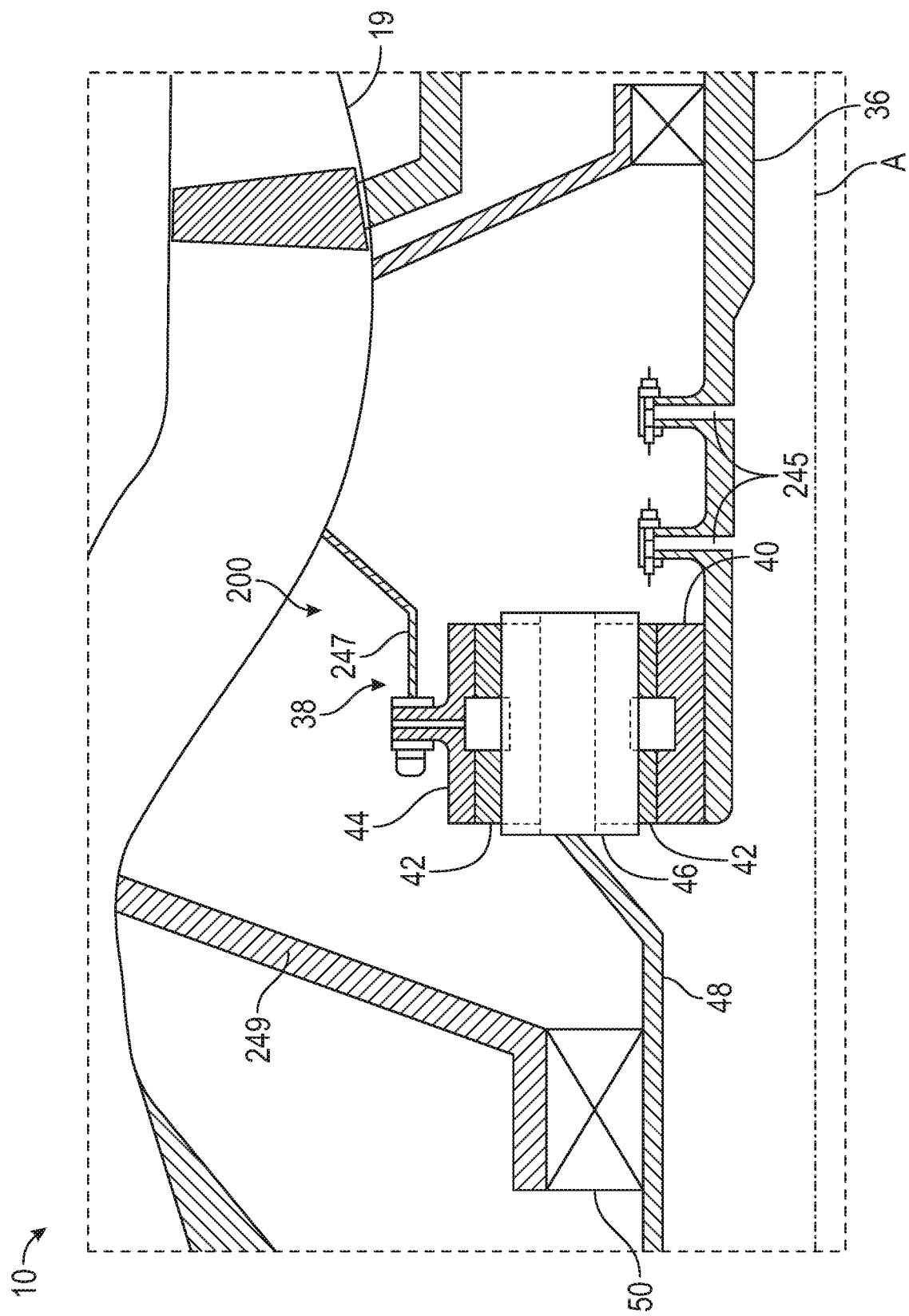
FIG. 4 shows an enlarged, schematic, cross-sectional view of a gearbox assembly of a gas turbine engine, taken along a centerline of the gas turbine engine, according to an embodiment of the present disclosure.
Figure 5:
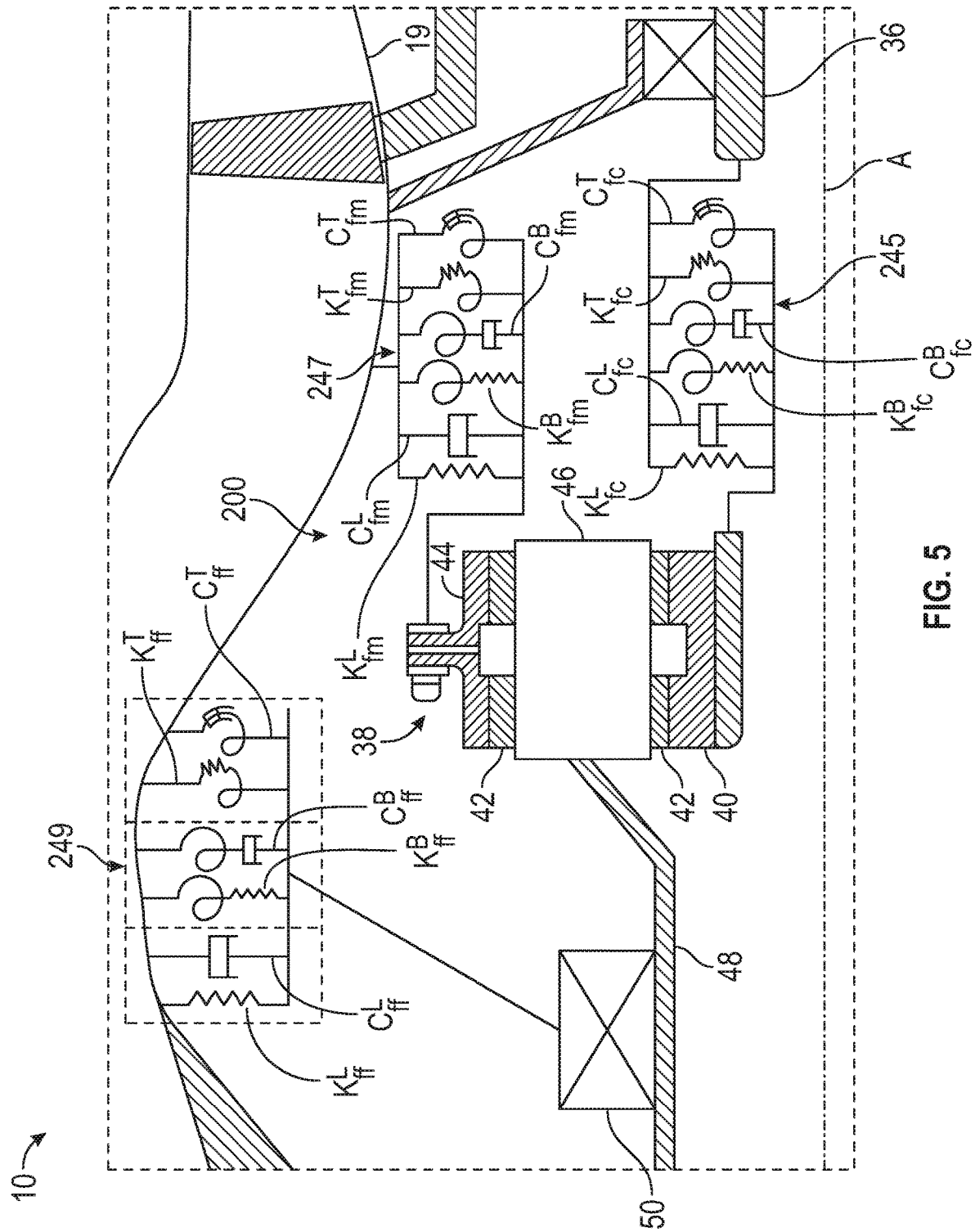
FIG. 5 shows a schematic, cross-sectional view of the gearbox assembly of FIG. 4, translated into a representative vibratory system.

FIGS. 4 and 5 illustrate enlarged, schematic side cross-sectional views of the gearbox assembly 38 of FIG. 1 with a mounting assembly 200. The mounting assembly 200 shown is that for a planetary configuration gearbox, described in more detail to follow. As mentioned, the gearbox assembly 38 includes the sun gear 40, the plurality of planet gears 42, and the ring gear 44. The low-pressure turbine 26 (FIG. 1) drives the low-pressure shaft 36, which is coupled to the sun gear 40 of the gearbox assembly 38. The sun gear 40 is coupled via a flex coupling 245 to the low-pressure shaft 36.

Radially outwardly of the sun gear 40, and intermeshing therewith, is the plurality of planet gears 42 that are coupled together by a planet carrier 46. The planet carrier 46 is coupled, via the fan shaft 48, to the fan 14 (FIG. 1) to drive rotation of the fan 14 about the axis A. The fan shaft 48 is coupled to a fan frame 249 via the fan bearing 50. The planet carrier 46 constrains the plurality of planet gears 42 to rotate together about the sun gear 40, while also allowing each planet gear of the plurality of planet gears 42 to rotate about its own axis. Thus, the plurality of planet gears 42, the planet carrier 46, and the sun gear 40 rotate about the engine axis A. Radially outwardly of the plurality of planet gears 42, and intermeshing therewith, is the ring gear 44, which is an annular ring gear 44. The ring gear 44 is coupled via a flex mount 247 to the engine static structure 19. The flex coupling 245, the flex mount 247, and the fan frame 249 define the mounting assembly 200 for the gearbox assembly 38. As described herein, the flex coupling 245, the flex mount 247, and the fan frame 249 may be referred to as mounting members.

Although not depicted in FIGS. 4 and 5 for clarity, each of the sun gear 40, the plurality of planet gears 42, and the ring gear 44 includes teeth about their periphery to intermesh with the other gears. In the example of FIGS. 4 and 5, the gearbox assembly 38 is a planetary configuration. That is, the ring gear 44 is static (being fixedly mounted via the flex mount 247 to the engine static structure 19), while the planet carrier 46 and the plurality of planet gears 42 therein, rotate about the engine centerline axis A. The planet carrier 46 constrains the plurality of planet gears 42 such that the plurality of planet gears 42 rotate together around the sun gear 40, while also enabling each planet gear of the plurality of planet gears 42 to rotate about its own axis. The rotation of the planet carrier 46 is conveyed to the fan 14 (FIG. 1) through the fan shaft 48.

FIG. 5 illustrates the mounting assembly 200 of FIG. 4 translated into a representative vibratory system where each of the flex coupling 245, the flex mount 247, and the fan frame 249 are shown by representative structural properties of the members, the representative structural properties being the structural stiffness (K) and the damping (C) of the respective members of the mounting assembly 200. As shown, each of the flex coupling 245, the flex mount 247, and the fan frame 249 includes the representative structural properties (structural stiffness and damping) in each of the lateral direction, the bending direction, and the torsional direction.

For example, FIG. 5 represents the gearbox supporting structure in terms of structural properties characterizing the nature of the coupling between the gearbox and the flex coupling 245. The flex coupling 245 may be represented in terms of a flex coupling lateral stiffness $K_{fc}^L$, a flex coupling bending stiffness $K_{fc}^B$, a flex coupling torsional stiffness $K_{fc}^T$, a flex coupling lateral damping $C_{fc}^L$, a flex coupling bending damping $C_{fc}^B$, and a flex coupling torsional damping $C_{fc}^T$.

FIG. 5 represents the gearbox supporting structure in terms of structural properties characterizing the nature of the coupling between the gearbox and the flex mount 247. The flex mount 247 may be represented in terms of a flex mount lateral stiffness $K_{fm}^L$, a flex mount bending stiffness $K_{fm}^B$, a flex mount torsional stiffness $K_{fm}^T$, a flex mount lateral damping $C_{fm}^L$, a flex mount bending damping $C_{fm}^B$, and a flex mount torsional damping $C_{fm}^T$.

FIG. 5 represents the gearbox supporting structure in terms of structural properties characterizing the nature of the coupling between the gearbox and the fan frame 249. The fan frame 249 may be represented in terms of a fan frame lateral stiffness $K_{ff}^L$, a fan frame bending stiffness $K_{ff}^B$, a fan frame torsional stiffness $K_{ff}^T$, a fan frame lateral damping $C_{ff}^L$, a fan frame bending damping $C_{ff}^B$, and a fan frame torsional damping $C_{ff}^T$.

The gearbox mounting systems and configurations in FIGS. 2 and 4 can be translated into a representative vibratory system, as shown in FIGS. 3 and 5, respectively. Each interface to the gear box, whether a fan frame, flex mount, or flex coupling has geometric qualities that translate to lateral, bending, and torsional stiffness and damping elements. For example, the flex mount support system may have relatively thin-walled undulating supports engineered to possess specific values for stiffness and damping. Support wall thickness and support member span or extent play a critical role in determining stiffness and damping values. Thinner members certainly allow for lower values stiffness quantities and shorter spans or member lengths contribute to higher values stiffness properties. Similarly, the 2 flex mount flex elements on the input shaft use member thickness and outer diameter to control stiffness and damping. As member thickness decreases and diaphragm diameter increases, stiffness properties decrease in the mounting location. For the fan frame support, this mounting element and location should be as stiff as possible while minimizing weight. The fan support frame needs a high degree of stiffness due to potential fan overloads that can occur; like in a blade out failure scenario. Therefore, the design approach for the flex mount and flex element lateral and bending stiffness values are desired to be notably softer than the fan support frame, which allows for the gearbox system to follow the fan frame support movement while generating low reaction forces and moments at the flex mount and flex coupling mounting locations. Conversely, the torsional stiffness of the flex mount and flex coupling mounting elements is desired to be design as stiff as possible since these elements are in the main torque transmission torque path with the fan.

Figure 6:
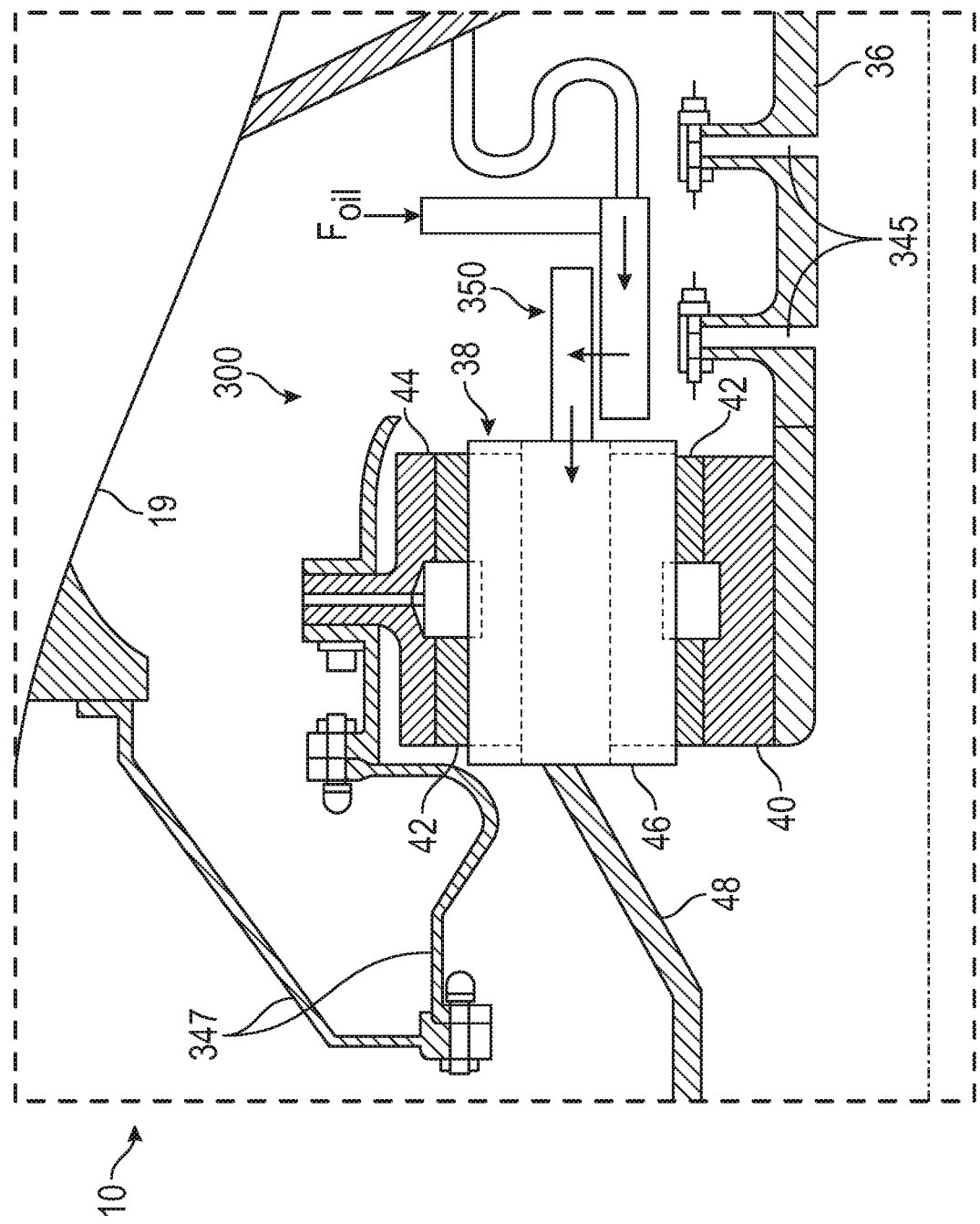
FIG. 6 shows a schematic, cross-sectional view of a gearbox assembly of a gas turbine engine with an oil transfer device, according to an embodiment of the present disclosure.

FIG. 6 illustrates an enlarged, schematic side view of the gearbox assembly 38 of FIG. 1 with a mounting assembly 300. The mounting assembly 300 is that for a planetary configuration, as described with respect to FIGS. 4 and 5. That is, the ring gear 44 is coupled with a flex mount 347 to the engine static structure 19. The plurality of planet gears 42 is constrained within a planet carrier 46, which is coupled to the fan shaft 48, and the sun gear 40 is coupled with a flex coupling 345 to the low-pressure shaft 36. Although not shown in FIG. 6, the fan shaft 48 may be coupled with a fan frame to the engine static structure, such as described with respect to FIGS. 4 and 5.

The gearbox assembly 38 may include an oil transfer device 350. The oil transfer device 350 allows an oil flow $F_{oil}$ to flow into the gearbox assembly 38 and to lubricate the plurality of planet gears 42, which in turn lubricates the sun gear 40 and the ring gear 44. Although shown with respect to a planetary configuration, the oil transfer device 350 may be provided in a gearbox assembly 38 having a star configuration (e.g., as shown and described with respect to FIGS. 2 and 3).

FIGS. 7A to 7C illustrate degrees of freedom associated with structural stiffness K and damping coefficient C. These degrees of freedom characterize the most significant directions of movement affecting the respective stiffness or damping properties of the component as it interacts with the gearbox and engine frame(s) supporting it under loading conditions. The structural stiffness K and the damping coefficient C representations allowed the inventors to quantify the structural dynamic behavior of these degrees of freedom in a sufficiently accurate and representative manner, accounting for all factors in the component design that effects load transmission into the gearbox.

In FIGS. 7A to 7C, the Z-axis coincides with the engine centerline A (FIG. 1), the Y-axis extends perpendicular to the Z-axis in a radial direction (the radial direction upward and downward as shown in FIG. 1), and the X-axis extends perpendicular to the Z-axis in a radial direction (the radial direction into and out of the page as shown in FIG. 1).

In FIG. 7A, the lateral stiffness $K^L$ and the lateral damping $C^L$ affect the lateral stiffness and the lateral damping of the respective mounting component (e.g., the flex mount, the fan frame, and the flex coupling). This results in the lateral stiffness $K^L$ and the lateral damping $C^L$ affecting the movement of the respective component in the lateral direction. The lateral direction includes the linear motion of the component in a Y-axis radial direction 700 and an X-axis radial direction 710.

In FIG. 7B, the bending stiffness $K^B$ and the bending damping $C^B$ affect the bending stiffness and the bending damping of the respective mounting component (e.g., the flex mount, the fan frame, and the flex coupling). This results in the bending stiffness $K^B$ and the bending damping $C^B$ affecting the rotational movement of the respective component in the bending direction. The bending direction includes the bending or rotational motion of the component in a yaw direction 720 and a pitch direction 730.

In FIG. 7C, the torsional stiffness $K^T$ and the torsional damping $C^T$ affect the torsional stiffness and the torsional damping of the respective mounting component (e.g., the flex mount, the fan frame, and the flex coupling). This results in the torsional stiffness $K^T$ and the torsional damping $C^T$ affecting the rotational movement of the respective component in a torsional direction 740 about the engine centerline (e.g., about the centerline A or Z-axis as shown in FIG. 1).

This represents the load path of the gears and the torque of the respective component with respect to the fan 14 (FIG. 1).

Figure 8A:
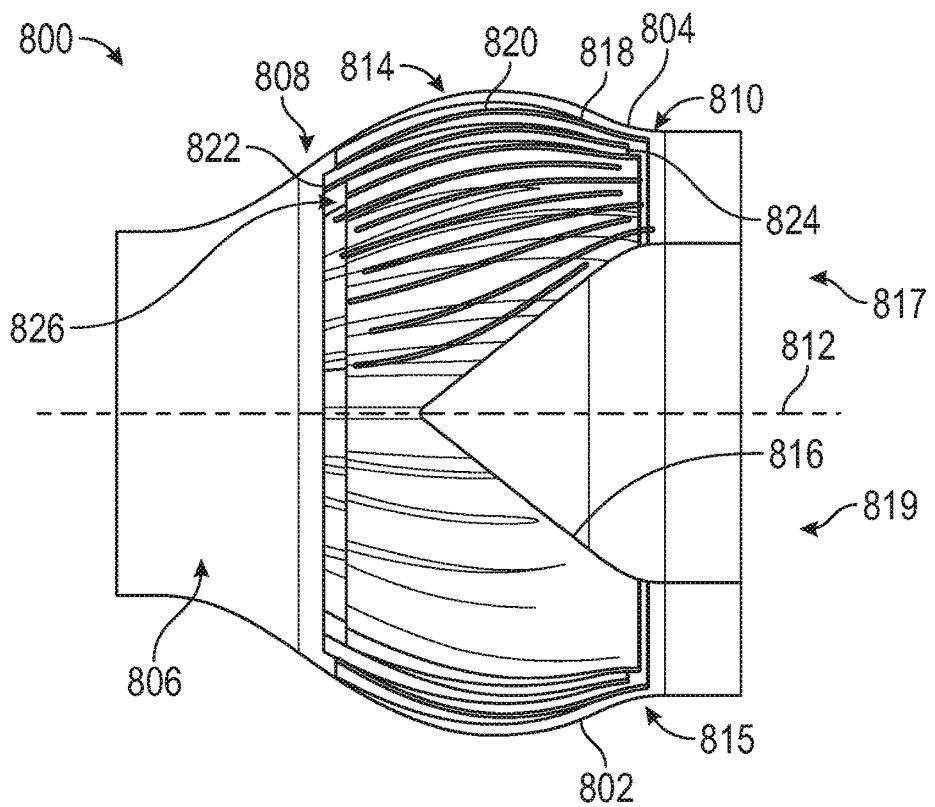
FIG. 8A shows a schematic, cross-sectional view of a heat exchanger, taken along the centerline of the gas turbine engine, and isolated from the turbine engine, according to an embodiment of the present disclosure.
Figure 8B:
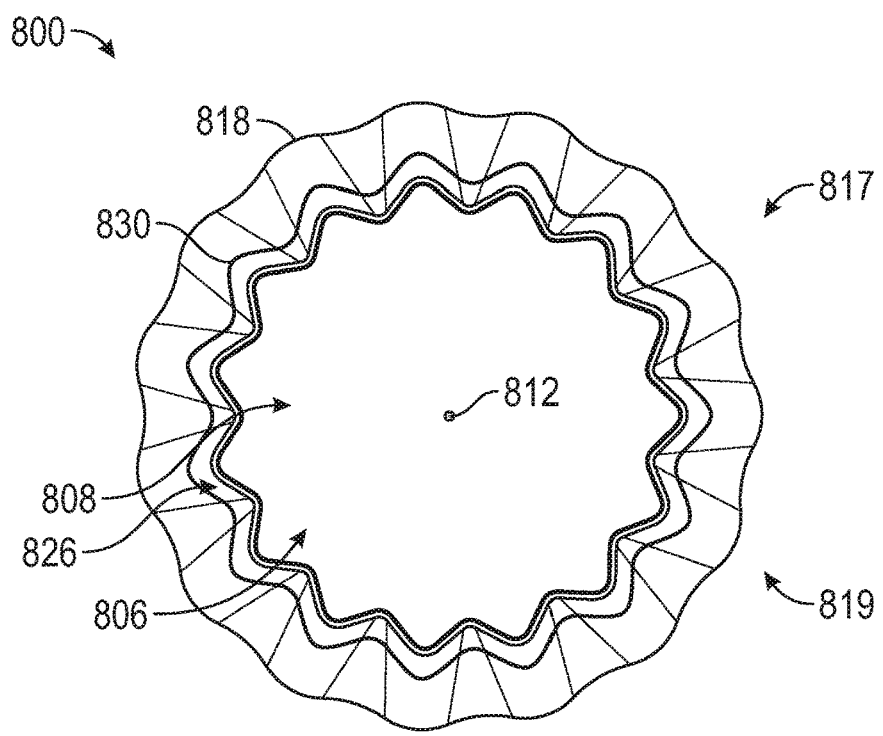
FIG. 8B shows a schematic forward view of the heat exchanger of FIG. 8A, according to the present disclosure.
Figure 8C:
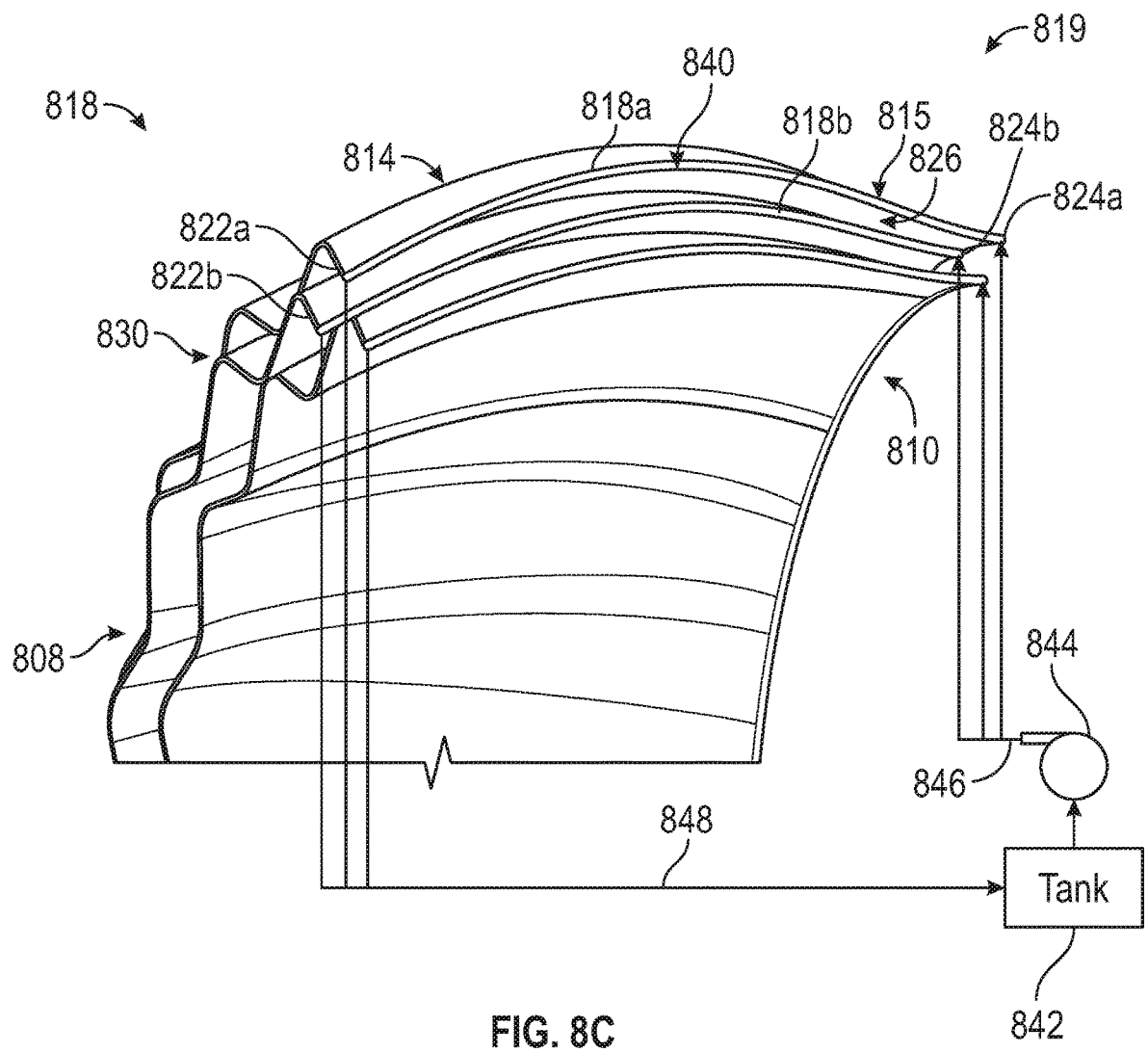
FIG. 8C shows a partial schematic, side view of a plurality of fins of the heat exchanger of FIG. 8A, according to the present disclosure.

FIG. 8A shows a schematic, cross-sectional view of a heat exchanger 800, taken along the centerline A of the gas turbine engine 10, and isolated from the gas turbine engine 10, according to an embodiment of the present disclosure. FIG. 8B shows a schematic forward view of the heat exchanger 800, according to the present disclosure. FIG. 8C shows a partial schematic, side view of a plurality of fins 818 of the heat exchanger 800, according to the present disclosure.

The heat exchanger 800 described herein is particularly suitable for use with a flowpath that is intolerant to flow losses. While flow losses are always undesirable, the term "intolerant to flow losses" as used herein refers to a flowpath in which undesirable effects caused by flow losses would outweigh the desirable effects of the heat transfer. This would generally be a flowpath having a flow with a Mach number greater than about 0.25. With reference to FIG. 1, nonlimiting examples of a flowpath in which the heat exchanger 800 could be utilized include: a heat exchanger 800a used as an intercooler in the core flow passage 21 between the low-pressure compressor 18 and the high-pressure compressor 20, a heat exchanger 800b communicating with the bypass duct 32 and using fan air to cool auxiliary components (not shown), or a heat exchanger 800c communicating with the low-pressure turbine 26 and used as a cooler or a recuperator (e.g., in the core flow passage 21 between the high-pressure turbine 24 and the low-pressure turbine 26). The heat exchanger 800 has an axial length that affects an overall axial length of the gas turbine engine 10. For example, as the axial length of the heat exchanger 800 increases, the overall axial length of the gas turbine engine 10 increases. As the axial length of the heat exchanger 800 decreases, the overall axial length of the gas turbine engine 10 decreases. In this way, the axial length of the heat exchanger 800 affects the axial length of the low-pressure shaft 36, and, thus, the stiffness (K) or damping (C) of at least one of the flex coupling, the flex mount, or the fan frame of the mounting assemblies disclosed herein.

In FIGS. 8A to 8C, the heat exchanger 800 includes an inner peripheral wall 802 and an outer peripheral wall 804 radially spaced apart from the inner peripheral wall 802. The inner peripheral wall 802 is radially inner and the outer peripheral wall 804 is radially outer with reference to the centerline A (FIG. 1) of the gas turbine engine 10 (FIG. 1). The inner peripheral wall 802 and the outer peripheral wall 804 define a flow channel 806 therebetween for directing a first fluid therethrough. In one embodiment, the first fluid can be a working fluid of the gas turbine engine 10 (FIG. 1), such as air or combustion gasses. The flow channel 806 has an inlet 808 at an upstream end of the heat exchanger 800. The flow channel 806 has an outlet 810 at a downstream end of the heat exchanger 800.

The heat exchanger 800 is configured as a partially, or a wholly, arcuate body, formed by a partial, or a complete, revolution (e.g., annular) about an axis external to the inner peripheral wall 802 and the outer peripheral wall 804, such as, for example, the longitudinal centerline axis A (FIG. 1) of the gas turbine engine 10 (FIG. 1). The heat exchanger 800 includes a longitudinal centerline axis 812 that represents an abstract surface that divides the flow-orthogonal area between the inner peripheral wall 802 and the outer peripheral wall 804 into two parts, which have approximately equal flow areas.

The flow channel 806 communicates with, or forms part of, a flowpath of the gas turbine engine 10 (FIG. 1). For example, the heat exchanger 800 may be integral to the core flow passage 21 between the low-pressure compressor 18 and the high-pressure compressor 20. In some embodiments, the heat exchanger 800 can be integral to the bypass duct 32 (FIG. 1) downstream of the fan 14 (FIG. 1). In some embodiments, the heat exchanger 800 can be integral to the core flow passage 21 between the high-pressure turbine 24 and the low-pressure turbine 26.

The heat exchanger 800 includes a diverging portion 814 downstream of the inlet 808. Within the diverging portion 814, the inner peripheral wall 802 and the outer peripheral wall 804 diverge so that the inner peripheral wall 802 and the outer peripheral wall 804 are laterally farther from the longitudinal centerline axis 812 than they are at the inlet 808. In this way, the inner peripheral wall 802 and the outer peripheral wall 804 bulge outwards. Thus, the heat exchanger 800 defines a diffuser as an area of the flow channel 806 increases as the inner peripheral wall 802 and the outer peripheral wall 804 diverge. The heat exchanger 800 also includes a non-diverging portion 815 downstream of the diverging portion 814. Within the non-diverging portion 815, the inner peripheral wall 802 and the outer peripheral wall 804 extend radially inward toward the longitudinal centerline axis 812 and then extend substantially axially (e.g., substantially parallel with the longitudinal centerline axis 812).

The heat exchanger 800 also includes a central peripheral wall 816 that is positioned radially between the inner peripheral wall 802 and the outer peripheral wall 804. The central peripheral wall 816 is substantially annular and divides the flow channel 806 into a top portion 817 and a bottom portion 819. In the orientation of FIG. 8A, portions of the heat exchanger 800 above the longitudinal centerline axis 812 are referred to as the top portion 817 and portions of the heat exchanger 800 below the longitudinal centerline axis 812 are referred to as the bottom portion 819. The central peripheral wall 816 extends from approximately an axial center between the inlet 808 and the outlet 810 to the outlet 810. The central peripheral wall 816 diverges from the axial center to the outlet 810. Thus, the flow channel 806 and the outlet 810 are annular. In this way, the central peripheral wall 816 is a radially inner wall of the flow channel 806 and the outlet 810, and the inner peripheral wall 802 and the outer peripheral wall 804 are outer walls of the flow channel 806 and the outlet 810, with respect to the longitudinal centerline axis 812. Accordingly, the area of the flow channel 806 decreases from the bulge to the outlet 810 such the area of the outlet 810 is less than the area bulge of the flow channel 806.

The heat exchanger 800 includes a plurality of fins 818 disposed in the flow channel 806. In particular, the fins 818 are disposed within the diverging portion 814 of the heat exchanger 800. The fins 818 extend downstream and axially aft beyond the diverging portion 814 into the non-diverging portion 815. Each of the fins 818 has opposed side walls 820 extending between a leading edge 822 and a trailing edge 824. The fins 818 subdivide the flow channel 806 into a plurality of flow passages 826. The fins 818 are configured such that each flow passage 826 acts as diffuser. In this way, each flow passage 826 has an area that increases from the inlet 808 to the bulge. The area of each flow passage 826 decreases or remains constant from the bulge to the outlet 810. Such a configuration facilitates a lower Mach number of the flow through the heat exchanger 800, thus, reducing the air side pressure drop through the heat exchanger 800, as compared to heat exchangers without the benefit of the present disclosure. The fins 818 are shaped and sized so as to act as turning vanes, that is to turn the flow of the working fluid in an axial-radial plane in a manner so as to prevent flow separation from the wall surfaces. As shown in FIG. 8B, the fins 818 are nested within each other in that the fins 818 each have the same approximate shape along the circumferential direction.

With reference to FIG. 8C, each of the fins 818 presents area blockage of the flow channel 806 equal to its frontal area. In order to mitigate the effect of the area blockage, the leading edge 822 of the fins 818 may be arranged in a staggered configuration. In particular, the plurality of fins 818 includes a first fin 818a and a second fin 818b radially inward of the first fin 818a. The first fin 818a has a first leading edge 822a and a first trailing edge 824a. The second fin 818b has a second leading edge 822b and a second trailing edge 824b. The first leading edge 822a is axially forward of the second leading edge 822b. The first trailing edge 824a is axially forward of the second trailing edge 824b. In this way, the fins 818 are alternatingly staggered such that the first leading edge 822a is axially forward of the second leading edge 822b, and the first trailing edge 824a is axially forward of the second trailing edge 824b.

The staggered configuration may be arranged such that flow blockage of the fins 818 is introduced (considered from a flow point of view) at a rate similar to, or less than, the increase in flow area due to the divergence of the inner peripheral wall 802 and the outer peripheral wall 804. Such a staggered configuration reduces inlet blockage and outlet blockage. For example, at the inlet 808, which is upstream of the leading edge 822 of the fins 818, the flow area is completely open (no fin blockage). Downstream of the leading edge 822 of the fins 818, another flow area greater than the flow area at the inlet 808 is defined between the inner peripheral wall 802 and the outer peripheral wall 804. At this flow area, the flow channel 806 includes a blockage equivalent to a frontal area of the axial-most forward fins 818. The open flow area at this downstream location is at least equal to the flow area at the inlet 808 plus the frontal area of the axial-most forward fins 818. A similar configuration is repeated at successive downstream locations to complete the staggered configuration of the plurality of fins 818. The illustrated staggered pattern is "V" shaped or chevron shaped, but other specific arrangements are possible. The effect of the staggered configuration described above is that flow of the working fluid is always diffusing as it proceeds downstream from the inlet 808 to the bulge of the inner peripheral wall 802 and the outer peripheral wall 804.

The fins 818 also vary in radial position as a function of circumferential position about the longitudinal centerline axis 812. In particular, the fins 818 include one or more radial perturbations 830 that are structures, such as, for example, waves, ripples, or ridges, along the exterior surfaces of the fins 818 to create additional heat transfer surface area. In particular, the one or more radial perturbations 830 each define a peak and a valley, the peak having a greater diameter than the valley. The peak and the valley of the one or more radial perturbations 830 are repeated in a pattern circumferentially about the heat exchanger 800 such that the fins 818 vary in the radial position as a function of the circumferential position of the heat exchanger 800. In some embodiments, at least one of the leading edge 822 or the trailing edge 824 includes serrations. In this way, the serrations on the leading edge 822 or the trailing edge 824 help to reduce inlet and outlet loss effects.

At least one of the fins 818 includes a heat transfer structure in an interior of the fin 818. As used herein, the term "heat transfer structure" refers to a structure that functions to transfer heat energy from a first area, or region, in contact with the heat transfer structure to a second area, or region, that is also in contact with the heat transfer structure and that is spaced-away from the first area, or region. The heat transfer structure can transfer heat by at least one of conduction, convection, or radiation. In one example, the heat transfer structure includes a solid conduction element (not shown) disposed inside the fin 818, such as bars, rods, or plates, having a high heat transfer coefficient. For example, the fin 818 can include a metal alloy, such as, copper or aluminum, within the fin 818. In another example, the heat transfer structure includes one or more heat pipes (not shown) disposed inside the fin 818.

In another example, the heat transfer structure includes one or more channels for conducting flow of a cooling fluid (e.g. oil, fuel, or some other coolant). In particular, as shown in FIG. 8C, each of the fins 818 includes an inner fin passage 840 disposed within each of the fins 818. The inner fin passage 840 of each of the fines 818 is fluidly coupled to a cooling fluid system that includes a tank 842, a pump 844, one or more supply lines 846, and one or more return lines 848. The tank 842 stores a second fluid, also referred to as a cooling fluid (e.g., oil, fuel, or another cooling fluid) therein and is in fluid communication with the pump 844. The pump 844 can include any type of pump for pumping the cooling fluid from the tank 842 through the inner fin passage 840 of each of the fins 818. The supply lines 846 and the return lines 848 can include, for example, pipes, manifolds, valves, or the like, for directing the cooling fluid therethrough. The supply lines 846 are in fluid communication with the inner fin passage 840 of the fins 818 for directing the cooling fluid from the tank 842 into the inner fin passage 840. In particular, the supply lines 846 are coupled to the inner fin passage 840 at a downstream end of the heat exchanger 800 (downstream with respect to the flow of the first fluid through the heat exchanger 800). The return lines 848 are coupled to the inner fin passage 840 at an upstream end of the heat exchanger 800 (upstream with respect to the flow of the first fluid through the heat exchanger 800).

In operation, the first fluid flows through the flow channel 806 and over the fins 818. The pump 844 pumps the second fluid from the tank 842 through the inner fin passage 840 of each of the one or more fins 818. In particular, the supply lines 846 direct the second fluid from the tank 842 to the inner fin passage 840. The inner fin passage 840 directs the second fluid upstream (with respect to the flow of the first fluid) to the return lines 848. The return lines 848 direct the second fluid back to the tank 842. In this way, the second fluid circulates through the inner fin passage 840. The second fluid is a coolant supplied at a lower temperature than the first fluid. Depending on the relative temperatures of the first fluid and the second fluid, heat is transferred from the first fluid into the fins 818, then to the second fluid, or from the second fluid into the fins 818, then to the first fluid. The diverging section 814 of the flow channel 806 diffuses the first fluid, reducing the velocity and increasing the pressure of the first fluid. The fins 818 act as turning vanes, as well as diffuser walls, allowing the first fluid to diffuse without separating from the inner peripheral wall 802 and the outer peripheral wall 804. The non-diverging portion 815 re-accelerates the first fluid to a desired Mach number as the first fluid flows through the outlet 810 and into the core flow passage 21.

When developing a gas turbine engine, the interplay among components can make it particularly difficult to select or to develop one component during engine design and prototype testing, especially, when some components are at different stages of completion. For example, one or more components may be nearly complete, yet one or more other components may be in an initial or a preliminary phase, such that only one (or a few) design parameters are known. It is desired to arrive at what is possible at an early stage of design, so that the down selection of candidate optimal designs, given the tradeoffs, become more possible. Heretofore, the process has sometimes been more ad hoc, selecting one design or another without knowing the impact when a concept is first taken into consideration. For example, and referring to FIG. 1, various aspects of the fan 14 design, the nacelle 30 design, the casing 17 design, the engine static structure 19 design, the high-pressure shaft 39 design, and/or the low-pressure shaft 36 design may not be known, but such components impact the bending experienced by the gas turbine engine 10 and, thus, may influence the design of the mounting assembly of the gearbox assembly 38.

There is a desire to narrow the range of configurations or combination of features that can yield favorable results given the constraints of the design, feasibility, manufacturing, certification requirements, etc., early in the design selection process to avoid wasted time and effort, in addition to improving upon the types of mounting that are optimal for gearbox longevity and better suited to satisfy mission requirements. During the course of the evaluation of different embodiments as set forth above, the inventors, discovered, unexpectedly, that there exists a relationship between the stiffness of a mounting component and the damping of a mounting component, which uniquely identifies a finite and readily ascertainable (in view of this disclosure) number of embodiments suitable for a particular architecture that addresses the movement of the gears due to the loading on the engine casing. This was found to enable a better system of mounting components, more optimal to the mechanical system, compared to existing methods. The relationship defined is the dynamic stiffness that accounts for both the static and the dynamic aspects of the mechanical system (e.g., the moving gears, the static mountings, the casing, etc.). The dynamic stiffness relationship is referred to by the inventors as an Impedance Parameter (Z), and is defined according to the following relationship (1) between the structural stiffness K and the equivalent damping coefficient, also referred to as viscous damping coefficient, C:

$$\text{Impedance Parameter } (Z) = K * C \quad (1)$$

As discussed above, each of the mounting components experiences movement in three degrees of freedom: lateral, bending, and torsional. Thus, each component includes a dynamic stiffness or an Impedance Parameter for each degree of freedom. That is, each component has a lateral Impedance Parameter ($Z^L$), a bending Impedance Parameter ($Z^B$), and a torsional Impedance Parameter ($Z^T$), as defined according to the following relationships (2) to (10), where "L" refers to "lateral," "B" refers to "bending," "T" refers to "torsional," "fm" refers to "flex mount," "ff" refers to "fan frame," and "fc" refers to "flex coupling":

$$\text{Impedance Parameter } (Z^L_{fm}) = K^L_{fm} * C^L_{fm} \quad (2)$$

$$\text{Impedance Parameter } (Z^B_{fm}) = K^B_{fm} * C^B_{fm} \quad (3)$$

$$\text{Impedance Parameter } (Z^T_{fm}) = K^T_{fm} * C^T_{fm} \quad (4)$$

$$\text{Impedance Parameter } (Z^L_{ff}) = K^L_{ff} * C^L_{ff} \quad (5)$$

$$\text{Impedance Parameter } (Z^B_{ff}) = K^B_{ff} * C^B_{ff} \quad (6)$$

$$\text{Impedance Parameter } (Z^T_{ff}) = K^T_{ff} * C^T_{ff} \quad (7)$$

$$\text{Impedance Parameter } (Z^L_{fc}) = K^L_{fc} * C^L_{fc} \quad (8)$$

$$\text{Impedance Parameter } (Z^B_{fc}) = K^B_{fc} * C^B_{fc} \quad (9)$$

$$\text{Impedance Parameter } (Z^T_{fc}) = K^T_{fc} * C^T_{fc} \quad (10)$$

Thus, referring back to FIGS. 2 to 5, relationships (2), (3), and (4) define Impedance Parameters for the flex mount 147 and the flex mount 247; relationships (5), (6), and (7) define Impedance Parameters for the fan frame 149 and the fan frame 249; and relationships (8), (9), and (10) define Impedance Parameters for the flex coupling 145 and the flex coupling 245.

The mounting components described in the present disclosure do not have a true viscous damping coefficient, but instead possess structural damping, also referred to as hysteretic damping. Hysteretic damping varies directly with the magnitude of displacement and may be defined by the relationship (11):

$$\text{Damping } (C) = \frac{h}{\omega} \quad (11)$$

where "h" is the hysteretic damping coefficient and ω is the frequency of vibration. Thus, at lower vibrations the hysteretic damping tends to be greater, consistent with the magnitude of displacement expected at lower (vs. higher) vibrational frequencies. The hysteretic damping is further defined by the structural stiffness and the loss factor as shown in relationship (12).

$$\text{Hysteretic Coefficient } (h) = K * \eta \quad (12)$$

where "K" is the structural stiffness and η is the loss factor. The loss factor is defined by the material of the component. Some exemplary loss factors are shown in Table 1.

TABLE 1

| Material | Loss Factor (η) |
| --- | --- |
| Aluminum | 0.3 to 10 (×10⁻⁵) |
| Lead (pure) | 5 to 30 (×10⁻²) |
| Lead (with antimony) | 1 to 4 (×10⁻²) |
| Iron | 1 to 4 (×10⁻⁴) |
| Steel | 0.2 to 3 (×10⁻⁴) |

Relationship (12) may be inserted into relationship (11) to define relationship (13):

$$\text{Damping } (C) = \frac{K * \eta}{\omega} \quad (13)$$

Relationship (13) may be inserted into relationship (1) to define relationship (14):

$$\text{Impedance Parameter }(Z) = \frac{K^2 * n}{\omega} \tag{14}$$

Therefore, as discussed above, each of the mounting components may have an impedance parameter defined according to the following relationships (15) to (23):

$$\text{Impedance Parameter}\left(Z_{fm}^L\right) = \frac{\left(K_{fm}^L\right)^2 * n}{\omega} \tag{15}$$

$$\text{Impedance Parameter}\left(Z_{fm}^B\right) = \frac{\left(K_{fm}^B\right)^2 * n}{\omega} \tag{16}$$

$$\text{Impedance Parameter}\left(Z_{fm}^T\right) = \frac{\left(K_{fm}^T\right)^2 * n}{\omega} \tag{17}$$

$$\text{Impedance Parameter}\left(Z_{ff}^L\right) = \frac{\left(K_{ff}^L\right)^2 * n}{\omega} \tag{18}$$

$$\text{Impedance Parameter}\left(Z_{ff}^B\right) = \frac{\left(K_{ff}^B\right)^2 * n}{\omega} \tag{19}$$

$$\text{Impedance Parameter}\left(Z_{ff}^T\right) = \frac{\left(K_{ff}^T\right)^2 * n}{\omega} \tag{20}$$

$$\text{Impedance Parameter}\left(Z_{fc}^L\right) = \frac{\left(K_{fc}^L\right)^2 * n}{\omega} \tag{21}$$

$$\text{Impedance Parameter}\left(Z_{fc}^B\right) = \frac{\left(K_{fc}^B\right)^2 * n}{\omega} \tag{22}$$

$$\text{Impedance Parameter}\left(Z_{fc}^T\right) = \frac{\left(K_{fc}^T\right)^2 * n}{\omega} \tag{23}$$

Thus, referring back to FIGS. 2 to 5, relationships (15), (16), and (17) define Impedance Parameters for the flex mount 147 and the flex mount 247; relationships (18), (19), and (20) define Impedance Parameters for the fan frame 149 and the fan frame 249; and relationships (21), (22), and (23) define Impedance Parameters for the flex coupling 145 and the flex coupling 245.

The inventors, further discovered, during the course of optimization of, and in consideration of the different loading environments for a gearbox and associated mission requirements, that a ratio of impedance parameters provided insights on the selection of more optimal gearbox supporting components to use, versus choosing a component design without fully accounting or appreciating for the structural coupling between the components. The ratio can account for the effect that properties of one component may have on another in supporting a gearbox. The Impedance Parameter Ratio (IPR) is expressed according to relationships (24) to (29):

$$IPR_{\frac{fm}{ff}}^L = \frac{z_{fm}^L}{z_{ff}^L} \tag{24}$$

$$IPR_{\frac{fm}{ff}}^B = \frac{z_{fm}^B}{z_{ff}^B} \tag{25}$$

$$IPR_{\frac{fm}{ff}}^T = \frac{z_{fm}^T}{z_{ff}^T} \tag{26}$$

$$IPR_{\frac{fc}{ff}}^L = \frac{z_{fc}^L}{z_{ff}^L} \tag{27}$$

$$IPR_{\frac{fc}{ff}}^B = \frac{z_{fc}^B}{z_{ff}^B} \tag{28}$$

$$IPR_{\frac{fc}{ff}}^T = \frac{z_{fc}^T}{z_{ff}^T} \tag{29}$$

where relationships (24) to (26) define an IPR of the flex mount with respect to the fan frame and relationships (27) to (29) define an IPR of the flex coupling with respect to the fan frame.

The ratio of Impedance Parameters for the lateral stiffness and the bending stiffness is preferably designed to be low as compared to the fan frame. This allows the gears to move more easily together, while retaining uniform loading and reducing edge loading on gears. For example, as shown in the embodiments 1 and 2 to follow, the stiffness K of the fan frame is selected and predetermined as set forth in Table 2. The stiffness of the flex mount and the flex coupling is defined by the relationships herein, as described with respect to the embodiments to follow.

Unlike the lateral stiffness and the bending stiffness Impedance Parameter ratios, ratios for torsional stiffness are designed to be relatively high compared to the fan frame. Highly flexible torsional stiffness values for the flex coupling and the flex mount are undesirable as that leads to high stresses and introduce unwanted vibration modes into the system.

The present disclosure defines an Impedance Parameter Ratio of the three main gearbox assembly-engine interfaces (e.g., the fan frame, the flex coupling, and the flex mount). The design parameter not only accounts for stiffness, but also accounts for structural hysteresis in the form of equivalent viscous damping. The three main elements that interface the gearbox assembly are (1) the fan shaft with stiff connection to the fan frame, (2) the flex mount, and (3) the flex coupling from the input shaft. The magnitude of the ratio of Impedance Parameters is preferably made relative to the fan frame impedance as this was found to provide the most convenient indicator of relative impedance for choosing an optimal design.

The Impedance Parameter was found to be unique for two main reasons, as alluded to earlier. First, the Impedance Parameter not only accounts for structural stiffness (K), but, also for damping (C). This allows the Impedance Parameter to account for the dynamics of the mechanical system in addition to the static performance or integrity of the mechanical system. The stiffness addresses static loads and operating conditions and the damping addresses dynamic scenarios, for example, under rotation and inflight maneuvers. Second, in addition to the lateral and the rotational or the bending stiffness, the Impedance Parameter defines desirable design choices for torsional stiffness as well.

As discussed further below, the inventors have identified a range of the Impedance Parameter for each of the mounting components, with respect to one another, that enable a mounting assembly 100 and the mounting assembly 200 design such that gears of the gearbox assembly 38 are best able to maintain alignment during engine loading conditions (e.g., take off and climb). As mentioned, the lateral stiffness and the bending stiffness of each of the flex mount and the flex coupling are lower than the respective lateral stiffness and the bending stiffness of the fan frame. The ratio of the Impedance Parameter of the flex mount with respect to the fan frame for the lateral stiffness and the bending stiffness (e.g., the lateral IPR of relationship (24) and the bending IPR of relationship (25)) is less than or equal to 0.5. In some examples, the ratio is less than or equal to 0.4. In some examples, the ratio is between 0.1 and 0.5. In some examples, the ratio is between 0.1 and 0.4. In some examples, the ratio is between 0.1 and 0.5. In some examples, the ratio is between 0.1 and 0.4. In some examples, the ratio is between 0.2 and 0.5. In some examples, the ratio is between 0.3 and 0.4. In some examples, the ratio is 0.1, 0.2, 0.3, 0.4, 0.5, or any discrete value between 0.1 and 0.5.

The ratio of the Impedance Parameter of the flex coupling with respect to the fan frame for the lateral stiffness and the bending stiffness (e.g., the lateral IPR of relationship (27) and the bending IPR of relationship (28)) is less than or equal to 0.5. In some examples, the ratio is less than or equal to 0.4. In some examples, the ratio is between 0.1 and 0.5. In some examples, the ratio is between 0.01 and 0.4. In some examples, the ratio is between 0.1 and 0.5. In some examples, the ratio is between 0.1 and 0.4. In some examples, the ratio is between 0.02 and 0.5. In some examples, the ratio is between 0.3 and 0.4. In some examples, the ratio is 0.1, 0.2, 0.3, 0.4, 0.5, or any discrete value between 0.1 and 0.5.

The torsional stiffness of each of the flex mount and the flex coupling is closer to the torsional stiffness of the fan frame. The ratio of the Impedance Parameter of the flex mount with respect to the fan frame and the flex coupling with respect to the fan frame for the torsional stiffness (e.g., the IPR of relationships (26) and (29)) is greater than or equal to 0.1. In some examples, the ratio is greater than or equal to 0.4. In some examples, the ratio is between 0.1 and 0.95. In some examples, the ratio is between 0.4 and 0.95.

Tables 2 to 5 describe exemplary embodiments 1 and 2 identifying the Impedance Parameter for two engine types. The exemplary engines of embodiments 1 and 2 may be turbofan engines. The exemplary engines of embodiments 1 and 2 may be employed with narrow body airframes or wide body airframes. The exemplary engines of embodiments 1 and 2 may include a gearbox assembly mounted with a mounting assembly 100 in a star configuration (e.g., as described with respect to FIGS. 2 and 3) or may include a gearbox assembly mounted with a mounting assembly 200 in a planetary configuration (e.g., FIGS. 4 and 5). Table 2 describes the structural stiffness K of the fan frame. The values above are exemplary for embodiments 1 and 2. Other structural stiffnesses for the fan frame may be selected. The structural stiffness of the fan frame may be defined by material properties, component dimensions, and other known factors that affect structural stiffness.

TABLE 2

| Embodiment | $K_{ff}^L$ (lb/in) | $K_{ff}^B$ (in-lb/rad) | $K_{ff}^T$ (in-lb/rad) |
|---|---|---|---|
| 1 | 1,020,408 | 448,430,493 | 1E+12 |
| 2 | 800,000 | 351,569,506 | 1E+12 |

The values for lateral, bending, and torsional structural stiffnesses of the fan frame for embodiments 1 and 2 are exemplary. The lateral structural stiffness of the fan frame may be less than or equal to 1,200,000 lb/in. In some examples, the lateral structural stiffness of the fan frame may be in the range of 400,000 lb/in to 1,200,000 lb/in, or any value or subrange therebetween. In some examples, the lateral structural stiffness of the fan frame may be in the range of 800,000 lb/in to 1,020,408 lb/in, or any value or subrange therebetween.

The bending structural stiffness of the fan frame may be less than or equal to 600,000,000 in-lb/rad. In some examples, the bending structural stiffness of the fan frame may be in the range of 200,000,000 in-lb/rad to 600,000,000 in-lb/rad, or any value or subrange therebetween. In some examples, the bending structural stiffness of the fan frame may be in the range of in the range of 351,569,506 in-lb/rad and 448,430,493 in-lb/rad, or any value or subrange therebetween.

The torsional structural stiffness of the fan frame may be 1E+12 in-lb/rad. In some examples, the torsional structural stiffness of the fan frame may be between 1E+11 in-lb/rad and 5E+12 in-lb/rad, or any value or subrange therebetween.

The lateral, bending and torsional stiffness values for the fan frame vary in this manner depending on thrust class, fan frame design, bearing placements and types of bearings supporting the gearbox position and their relative placements to the gearbox, size of the fan and other parts of engine where the fan frame is the primary loading bearing structure.

Once the fan frame values are generally known, it may be determined, using the IPR, the optimal design for the structure supporting the gearbox, starting from the general guideline of the stiffness for the flex mount and the flex coupling are lower (in the case of lateral and bending stiffness) or higher (in the case of torsional stiffness) than the fan frame. When used in combination a desirable stiffness for the flex mount and the flex coupling may be determined. For example, the relationships (15) and (18) are imported into the relationship (24) and the relationships (16) and (19) are imported into the relationship (25) to determine the structural stiffness of the flex mount in the lateral and bending directions, as defined in relationship (30). The relationships (17) and (20) are imported into the relationship (26) to determine the structural stiffness of the flex mount in the torsional direction, as defined in relationship (31).

The structural stiffness K of the flex mount is determined for steel and ground idle vibrations with an Impedance Parameter Ratio (IPR) of less than or equal to 0.5 for the lateral and bending directions and an IPR of greater than or equal to 0.01 for torsion. The loss factor η is 0.2 to 0.0003 for steel and rotational frequency of vibration ω for ground idle may be taken as 3 krpm (314 rad/sec), which represents an average low pressure turbine rotational frequency of vibration lower than or equal to that experienced at ground idle conditions. This results in a structural stiffness of the flex mount defined by the relationship (30) for lateral and bending and the relationship (31) for torsional:

$$K_{fm} \leq 0.71 K_{ff} \qquad (30)$$

$$K_{fm} \geq 0.1 K_{ff} \qquad (31)$$

Inserting the values of Table 2 into relationships (30) and (31), the structural stiffness of the flex mount are determined as shown in Table 3.

TABLE 3

| Embodiment | $K_{fm}^L$ (lb/in) | $K_{fm}^B$ (in-lb/rad) | $K_{fm}^T$ (in-lb/rad) |
|---|---|---|---|
| 1 | ≤724,489 | ≤318,385,650 | ≥1E+11 |
| 2 | ≤568,000 | ≤249,614,395 | ≥1E+11 |

The values of the structural stiffness of the flex mount for embodiments 1 and 2 are exemplary. As discussed above, the structural stiffness of the flex mount may be determined as a relationship to the structural stiffness of the fan frame. Thus, the ranges of the respective lateral structural stiffness, bending structural stiffness, and torsional structural stiffness for the fan frame set forth above may be imparted into relationships (30) and (31) to determine the ranges of the respective lateral structural stiffness, bending structural stiffness, and torsional structural stiffness for the flex mount.

A similar process is performed to arrive at the structural stiffness of the flex coupling. That is, the relationships (21) and (18) are imported into the relationship (27) and the relationships (22) and (19) are imported into the relationship (28) to determine the structural stiffness of the flex coupling in the lateral and bending directions as defined in relationship (32). The relationships (23) and (20) are imported into the relationship (29) to determine the structural stiffness of the flex coupling in the torsional direction as defined in relationship (33).

The structural stiffness K of the flex coupling is determined for steel and ground idle vibrations with an IPR of less than or equal to 0.5 for the lateral and bending directions and an IPR of greater than or equal to 0.01 for the torsional direction. The loss factor $\eta$ is 0.2 to 0.0003 for steel and the frequency of vibration $\omega$ for ground idle may be taken as 3 krpm (314 rad/sec), which represents a frequency of vibration lower than or equal to that experienced at ground idle conditions. This results in a structural stiffness of the flex coupling defined by the relationship (32) for lateral and bending and the relationship (33) for torsional:

$$K_{fc} \leq 0.71 \, K_{ff} \quad (32)$$

$$K_{fc} \geq 0.1 \, K_{ff} \quad (33)$$

Inserting the values of Table 2 into relationships (32) and (33), the structural stiffness of the flex coupling are determined as shown in Table 4.

TABLE 4

| Embodiment | $K_{fc}^L$ (lb/in) | $K_{fc}^B$ (in-lb/rad) | $K_{fc}^T$ (in-lb/rad) |
|---|---|---|---|
| 1 | ≤724,489 | ≤318,385,650 | ≥1E+11 |
| 2 | ≤568,000 | ≤249,614,395 | ≥1E+11 |

The values of the structural stiffness of the flex coupling for embodiments 1 and 2 are exemplary. As discussed above, the structural stiffness of the flex coupling may be determined as a relationship to the structural stiffness of the fan frame. Thus, the ranges of the respective lateral structural stiffness, bending structural stiffness, and torsional structural stiffness for the fan frame set forth above may be imparted into relationships (32) and (33) to determine the ranges of the respective lateral structural stiffness, bending structural stiffness, and torsional structural stiffness for the flex coupling.

Figure 9A:
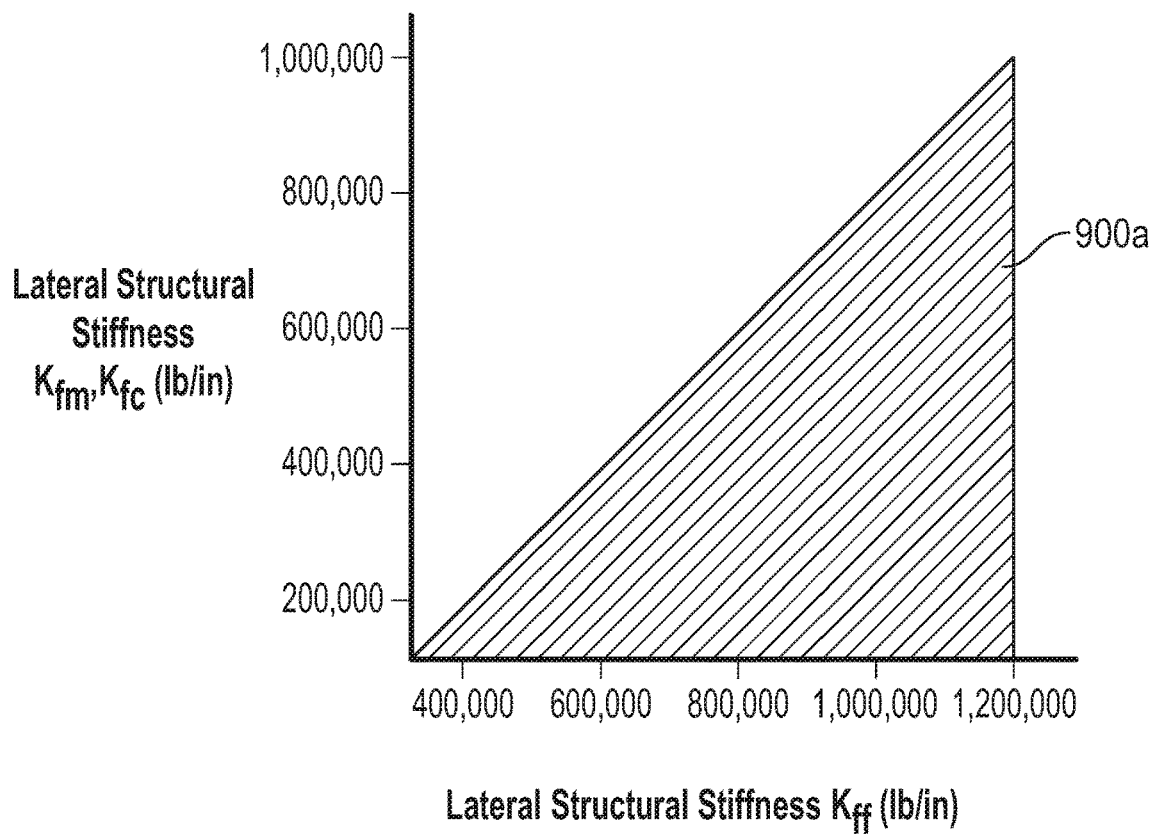
FIG. 9A shows a graph illustrating the lateral structural stiffness of the flex coupling and the flex mount as a function of the lateral structural stiffness of the fan frame.
Figure 9B:
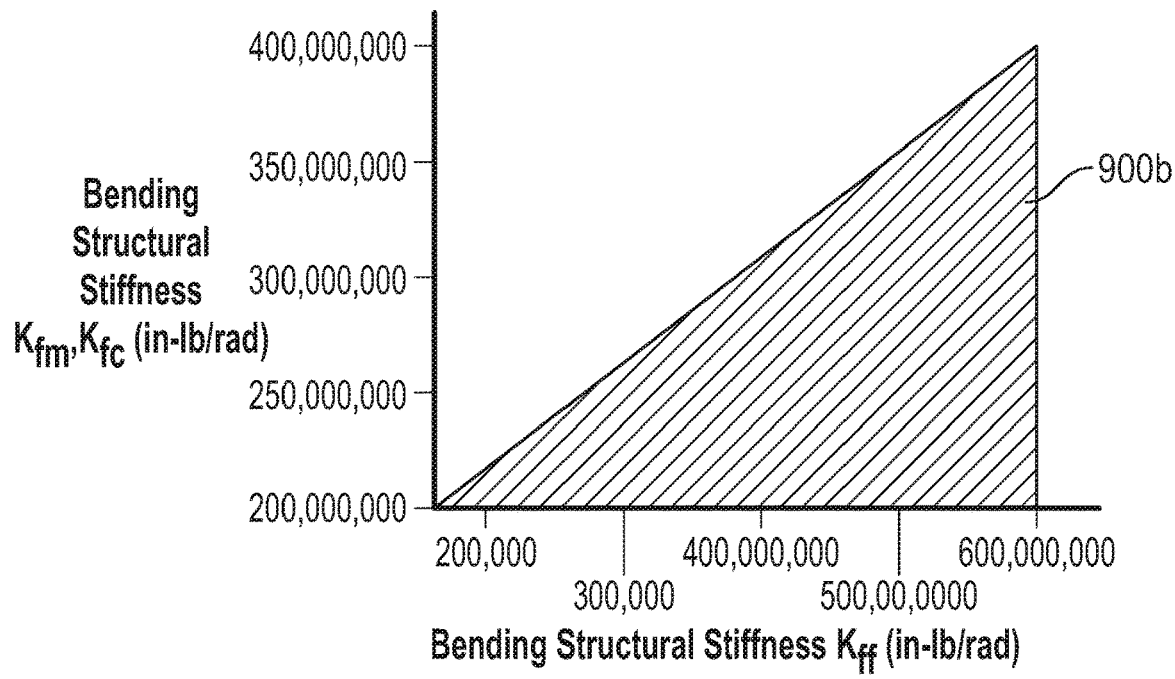
FIG. 9B shows a graph illustrating the bending structural stiffness of the flex coupling and the flex mount as a function of the bending structural stiffness of the fan frame.
Figure 9C:
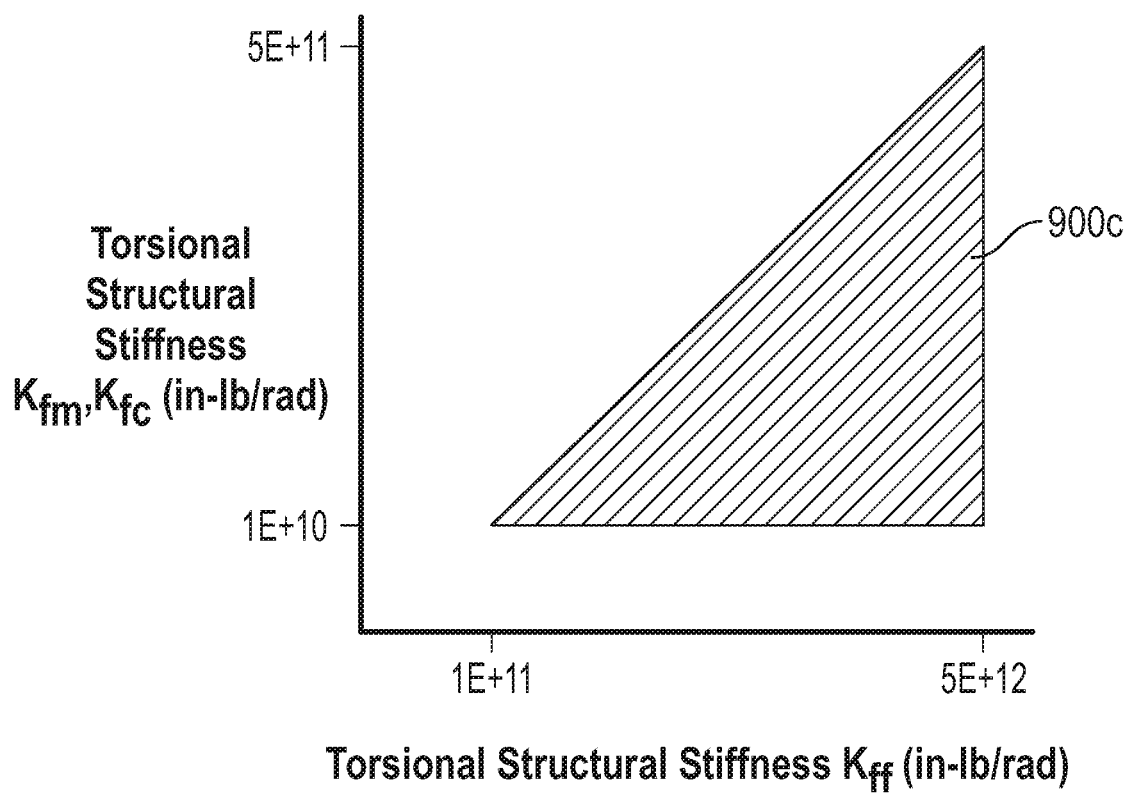
FIG. 9C shows a graph illustrating the torsional structural stiffness of the flex coupling and the flex mount as a function of the torsional structural stiffness of the fan frame.

Thus, as shown in FIGS. 9A to 9C, the structural stiffness of each of the flex coupling and the flex mount are a function or factor of the structural stiffness of the fan frame. For example, in FIG. 9A, the lateral structural stiffness of the flex mount and the flex coupling are a function of the lateral structural stiffness of the fan frame, as shown by area 900a. In FIG. 9B, the bending structural stiffness of the flex mount and the flex coupling are a function of the bending structural stiffness of the fan frame, as shown by area 900b. In FIG. 9C, the torsional structural stiffness of the flex mount and the flex coupling are a function of the torsional structural stiffness of the fan frame, as shown by area 900c.

Furthermore, relying on Tables 2 to 4, the Impedance Parameter for the fan frame is determined for embodiments 1 and 2, to fall within the ranges shown in Table 5.

TABLE 5

| Embodiment | $Z_{ff}^L$ (lb/in)$^2$-s/rad | $Z_{ff}^B$ (lb-in)$^2$-s/rad$^3$ | $Z_{ff}^T$ (lb-in)$^2$-s/rad$^3$ |
|---|---|---|---|
| 1 | 9.63E+8 to 9.95E+5 | 1.28E+14 to 1.92E+11 | 6.36E+20 to 9.55E+17 |
| 2 | 4.08E+8 to 6.11E+5 | 7.87E+13 to 1.18E+11 | 6.37E+20 to 9.55E+17 |

Accordingly, as discussed above, The Impedance Parameter not only accounts for structural stiffness (K), but, also for damping (C). This allows the Impedance Parameter to account for the dynamics of the mechanical system in addition to the static performance or integrity of the mechanical system. The stiffness addresses static loads and operating conditions and the damping addresses dynamic scenarios, for example, under rotation and inflight maneuvers. In addition to the lateral and the rotational or the bending stiffness, the Impedance Parameter defines desirable design choices for torsional stiffness as well Further aspects of the present disclosure are provided by the subject matter of the following clauses.

According to an aspect of the present disclosure, a mounting assembly for a gearbox assembly of a gas turbine engine includes a flex coupling configured to mount a first gear of the gearbox assembly to a rotating shaft of the gas turbine engine, a flex mount configured to mount a second gear of the gearbox assembly to an engine static structure, and a fan frame configured to mount a third gear of the gearbox assembly to the engine static structure. Each of the flex coupling and the flex mount is characterized by a lateral impedance parameter ratio, a bending impedance parameter ratio, and a torsional impedance parameter ratio. The lateral impedance parameter ratio of the flex coupling, the flex mount, or both is less than or equal to 0.5, the bending impedance parameter ratio of the flex coupling, the flex mount, or both is less than or equal to 0.5, and the torsional impedance parameter ratio of the flex coupling, the flex mount, or both is greater than or equal to 0.01.

According to an aspect of the present disclosure, a mounting assembly for a gearbox assembly of a gas turbine engine includes a flex coupling configured to mount a first gear of the gearbox assembly to a rotating shaft of the gas turbine engine, wherein the flex coupling is characterized by a lateral impedance parameter ratio less than or equal to 0.5.

According to an aspect of the present disclosure, a mounting assembly for a gearbox assembly of a gas turbine engine includes a flex coupling configured to mount a first gear of the gearbox assembly to a rotating shaft of the gas turbine engine, wherein the flex coupling is characterized by a bending impedance parameter ratio less than or equal to 0.5.

According to an aspect of the present disclosure, a mounting assembly for a gearbox assembly of a gas turbine engine include a flex coupling configured to mount a first gear of the gearbox assembly to a rotating shaft of the gas turbine engine, wherein the flex coupling is characterized by a torsional impedance parameter ratio greater than or equal to 0.01.

According to an aspect of the present disclosure, a mounting assembly for a gearbox assembly of a gas turbine engine includes a flex mount configured to mount a first gear of the gearbox assembly to an engine static structure, wherein the flex mount is characterized by a lateral impedance parameter ratio less than or equal to 0.5.

According to an aspect of the present disclosure, a mounting assembly for a gearbox assembly of a gas turbine engine includes a flex mount configured to mount a first gear of the gearbox assembly to an engine static structure, wherein the flex mount is characterized by a bending impedance parameter ratio less than or equal to 0.5.

According to an aspect of the present disclosure, a mounting assembly for a gearbox assembly of a gas turbine engine includes a flex mount configured to mount a first gear of the gearbox assembly to an engine static structure, wherein the flex mount is characterized by a torsional impedance parameter ratio greater than or equal to 0.01.

The mounting assembly of any preceding clause, further including a flex mount configured to mount a second gear of the gearbox assembly to an engine static structure, and a fan frame configured to mount a third gear of the gearbox assembly to the engine static structure.

The mounting assembly of any preceding clause, further including a flex coupling configured to mount a second gear of the gearbox assembly to a rotating shaft of the gas turbine engine, and a fan frame configured to mount a third gear of the gearbox assembly to the engine static structure.

The mounting assembly of any preceding clause, wherein the first gear is a sun gear, the second gear is a plurality of planet gears, and the third gear is a ring gear.

The mounting assembly of any preceding clause, wherein the first gear is a sun gear, the second gear is a ring gear, and the third gear is a plurality of planet gears.

The mounting assembly of any preceding clause, wherein the gearbox assembly is arranged in a planetary configuration.

The mounting assembly of any preceding clause, wherein the gearbox assembly is arranged in a star configuration.

The mounting assembly of any preceding clause, wherein the lateral impedance parameter ratio of the flex mount is less than or equal to 0.5.

The mounting assembly of any preceding clause, wherein the bending impedance parameter ratio of the flex mount is less than or equal to 0.5.

The mounting assembly of any preceding clause, wherein the lateral impedance parameter ratio of the flex coupling is less than or equal to 0.5.

The mounting assembly of any preceding clause, wherein the bending impedance parameter ratio of the flex coupling is less than or equal to 0.5.

The mounting assembly of any preceding clause, wherein the torsional impedance parameter ratio of the flex mount is greater than or equal to 0.01.

The mounting assembly of any preceding clause, wherein the torsional impedance parameter ratio of the flex mount is between 0.01 and 0.95.

The mounting assembly of any preceding clause, wherein the torsional impedance parameter ratio of the flex coupling is greater than or equal to 0.01.

The mounting assembly of any preceding clause, wherein the torsional impedance parameter ratio of the flex mount is between 0.01 and 0.95.

The mounting assembly of any preceding clause, wherein the flex coupling is characterized by a flex coupling lateral impedance parameter, a flex coupling bending impedance parameter, and a flex coupling torsional impedance parameter, the flex mount is characterized by a flex mount lateral impedance parameter, a flex mount bending impedance parameter, and a flex mount torsional impedance parameter, and the fan frame is characterized by a fan frame lateral impedance parameter, a fan frame bending impedance parameter, and a fan frame torsional impedance parameter.

The mounting assembly of any preceding clause, wherein the fan frame has a fan frame structural stiffness and the flex mount has a flex mount structural stiffness based on the fan frame structural stiffness.

The mounting assembly of any preceding clause, wherein the fan frame structural stiffness includes a fan frame lateral structural stiffness, a fan frame bending structural stiffness, and a fan frame torsional structural stiffness, and the flex mount structural stiffness includes a flex mount lateral structural stiffness, a flex mount bending structural stiffness, and a flex mount torsional structural stiffness, wherein the flex mount lateral structural stiffness and the flex mount bending structural stiffness are less than the fan frame lateral structural stiffness and the fan frame bending structural stiffness, respectively and wherein the flex mount torsional structural stiffness is greater than the fan frame torsional structural stiffness.

The mounting assembly of any preceding clause, wherein the fan frame has a fan frame structural stiffness and the flex coupling has a flex coupling structural stiffness based on the fan frame structural stiffness.

The mounting assembly of any preceding clause, wherein the fan frame structural stiffness includes a fan frame lateral structural stiffness, a fan frame bending structural stiffness, and a fan frame torsional structural stiffness, and the flex coupling structural stiffness includes a flex coupling lateral structural stiffness, a flex coupling bending structural stiffness, and a flex coupling torsional structural stiffness, wherein the flex coupling lateral structural stiffness and the flex coupling bending structural stiffness are less than, the fan frame lateral structural stiffness and the fan frame bending structural stiffness, respectively, and wherein the flex coupling torsional structural stiffness is greater than the fan frame torsional structural stiffness.

According to an aspect of the present disclosure, a gas turbine engine including a gearbox assembly configured to transfer rotational energy from a turbine section to a fan, and a mounting assembly for coupling the gearbox assembly to the gas turbine engine, the mounting assembly having a flex coupling configured to mount a first gear of the gearbox assembly to a rotating shaft of the gas turbine engine, a flex mount configured to mount a second gear of the gearbox assembly to an engine static structure, and a fan frame configured to mount a third gear of the gearbox assembly to the engine static structure. Each of the flex coupling and the flex mount is characterized by a lateral impedance parameter ratio, a bending impedance parameter ratio, and a torsional impedance parameter ratio, and wherein the lateral impedance parameter ratio of the flex coupling, the flex mount, or both is less than or equal to 0.5, wherein the bending impedance parameter ratio of the flex coupling, the flex mount, or both is less than or equal to 0.5, and wherein the torsional impedance parameter ratio of the flex coupling, the flex mount, or both is greater than or equal to 0.01.

The gas turbine engine of the preceding clause, further including an oil transfer device configured to deliver a lubricant to the gearbox assembly.

The gas turbine engine of any preceding clause, wherein the first gear is a sun gear, the second gear is a plurality of planet gears, and the fan frame is a ring gear.

The gas turbine engine of any preceding clause, wherein the first gear is a sun gear, the second gear is a ring gear, and the third gear is a plurality of planet gears.

The gas turbine engine of any preceding clause, wherein the gearbox assembly is mounted to the gas turbine engine in a planetary configuration.

The gas turbine engine of any preceding clause, wherein the gearbox assembly is mounted to the gas turbine engine in a star configuration.

The gas turbine engine of any preceding clause, wherein the lateral impedance parameter ratio of the flex mount is less than or equal to 0.5.

The gas turbine engine of any preceding clause, wherein the bending impedance parameter ratio of the flex mount is less than or equal to 0.5.

The gas turbine engine of any preceding clause, wherein the lateral impedance parameter ratio of the flex coupling is less than or equal to 0.5.

The gas turbine engine of any preceding clause, wherein the bending impedance parameter ratio of the flex coupling is less than or equal to 0.5.

The gas turbine engine of any preceding clause, wherein the torsional impedance parameter ratio of the flex mount is greater than or equal to 0.01.

The gas turbine engine of any preceding clause, wherein the torsional impedance parameter ratio of the flex mount is between 0.01 and 0.95.

The gas turbine engine of any preceding clause, wherein the torsional impedance parameter ratio of the flex coupling is greater than or equal to 0.01.

The gas turbine engine of any preceding clause, wherein the torsional impedance parameter ratio of the flex mount is between 0.01 and 0.95.

The gas turbine engine of any preceding clause, wherein the flex coupling is characterized by a flex coupling lateral impedance parameter, a flex coupling bending impedance parameter, and a flex coupling torsional impedance parameter, the flex mount is characterized by a flex mount lateral impedance parameter, a flex mount bending impedance parameter, and a flex mount torsional impedance parameter, and the fan frame is characterized by a fan frame lateral impedance parameter, a fan frame bending impedance parameter, and a fan frame torsional impedance parameter.

The gas turbine engine of any preceding clause, wherein the fan frame has a fan frame structural stiffness and the flex mount has a flex mount structural stiffness based on the fan frame structural stiffness.

The gas turbine engine of any preceding clause, wherein the fan frame structural stiffness includes a fan frame lateral structural stiffness, a fan frame bending structural stiffness, and a fan frame torsional structural stiffness, and the flex mount structural stiffness includes a flex mount lateral structural stiffness, a flex mount bending structural stiffness, and a flex mount torsional structural stiffness, wherein the flex mount lateral structural stiffness and the flex mount bending structural stiffness are less than the fan frame lateral structural stiffness and the fan frame bending structural stiffness, respectively and wherein the flex mount torsional structural stiffness is greater than the fan frame torsional structural stiffness.

The gas turbine engine of any preceding clause, wherein the fan frame has a fan frame structural stiffness and the flex coupling has a flex mount structural stiffness based on the fan frame structural stiffness.

The gas turbine engine of any preceding clause, wherein the fan frame structural stiffness includes a fan frame lateral structural stiffness, a fan frame bending structural stiffness, and a fan frame torsional structural stiffness, and the flex coupling structural stiffness includes a flex coupling lateral structural stiffness, a flex coupling bending structural stiffness, and a flex coupling torsional structural stiffness, wherein the flex coupling lateral structural stiffness and the flex coupling bending structural stiffness are less than, the fan frame lateral structural stiffness and the fan frame bending structural stiffness, respectively, and wherein the flex coupling torsional structural stiffness is greater than the fan frame torsional structural stiffness.

A gas turbine engine comprising a fan, a compressor section, a turbine section that includes a rotating shaft, and a combustion section in flow communication with the compressor section and the turbine section, an engine static structure, a core flow passage in fluid communication with at least one of the compressor section, the turbine section, or the combustion section, and a heat exchanger. The heat exchanger comprises an inner peripheral wall and an outer peripheral wall extending between an inlet and an outlet, the inner peripheral wall and the outer peripheral wall defining a flow channel therebetween in fluid communication with the core flow passage, and a plurality of fins disposed in the flow channel, the plurality of fins dividing the flow channel into a plurality of flow passages. The gas turbine engine comprises a gearbox assembly configured to transfer rotational energy from the turbine section to the fan, and a mounting assembly for coupling the gearbox assembly to the gas turbine engine, the mounting assembly having a flex coupling configured to mount a first gear of the gearbox assembly to the rotating shaft of the gas turbine engine, a flex mount configured to mount a second gear of the gearbox assembly to the engine static structure, and a fan frame configured to mount a third gear of the gearbox assembly to the engine static structure. Each of the flex coupling and the flex mount is characterized by a lateral impedance parameter ratio, a bending impedance parameter ratio, and a torsional impedance parameter ratio, and wherein the lateral impedance parameter ratio of the flex coupling, the flex mount, or both is less than or equal to 0.5, wherein the bending impedance parameter ratio of the flex coupling, the flex mount, or both is less than or equal to 0.5, and wherein the torsional impedance parameter ratio of the flex coupling, the flex mount, or both is greater than or equal to 0.1.

The gas turbine engine of the preceding clause, further comprising a heat transfer structure disposed within at least one of the plurality of fins.

The gas turbine engine of any preceding clause, wherein the plurality of fins varies in radial position as a function of circumferential position.

The gas turbine engine of any preceding clause, wherein the plurality of fins each includes one or more radial perturbations along an exterior surface of the plurality of fins.

The gas turbine engine of any preceding clause, wherein the plurality of fins is nested within each other.

The gas turbine engine of any preceding clause, wherein the heat exchanger includes a central peripheral wall positioned radially between the inner peripheral wall and the outer peripheral wall, the central peripheral wall dividing the flow channel such that the central peripheral wall is an inner wall of the flow channel and the inner peripheral wall and the outer peripheral wall are outer walls of the flow channel.

The gas turbine engine of any preceding clause, wherein the central peripheral wall extends from approximately an axial center of the flow channel to the outlet and diverges from the axial center to the outlet.

The gas turbine engine of any preceding clause, wherein inner peripheral wall and the outer peripheral wall diverge such that the flow channel includes a diverging portion downstream of the inlet.

The gas turbine engine of any preceding clause, wherein the plurality of fins is disposed in the diverging portion.

The gas turbine engine of any preceding clause, wherein the diverging portion has a flow area that is greater than a flow area of the inlet.

The gas turbine engine of any preceding clause, wherein flow channel includes a non-diverging portion downstream of the diverging portion.

The gas turbine engine of any preceding clause, wherein the plurality of fins extends downstream of the diverging portion into the non-diverging portion.

The gas turbine engine of any preceding clause, wherein each of the plurality of fins includes opposed side walls extending between a leading edge and a trailing edge.

The gas turbine engine of any preceding clause, wherein the leading edge of the plurality of fins is arranged in a staggered configuration.

The gas turbine engine of any preceding clause, wherein the plurality of fins includes a first fin having a first leading edge and a second fin having a second leading edge, and the staggered configuration includes the first leading edge is axially forward of the second leading edge.

The gas turbine engine of any preceding clause, wherein the first fin has a first trailing edge and the second fin has a second trailing edge, the first trailing edge is axially forward of the second trailing edge.

A gas turbine engine comprising a fan, a compressor section, a turbine section that includes a rotating shaft, and a combustion section in flow communication with the compressor section and the turbine section, an engine static structure, a core flow passage in fluid communication with at least one of the compressor section, the turbine section, or the combustion section, and a heat exchanger. The heat exchanger comprises an inner peripheral wall and an outer peripheral wall extending between an inlet and an outlet, the inner peripheral wall and the outer peripheral wall defining a flow channel therebetween in fluid communication with the core flow passage, wherein the inner peripheral wall and the outer peripheral wall diverge such that the flow channel includes a diverging portion downstream of the inlet, and a plurality of fins disposed in the diverging portion of the flow channel, the plurality of fins dividing the flow channel into a plurality of flow passages, wherein the plurality of fins each includes one or more radial perturbations along an exterior surface of the plurality of fins, each of the plurality of fins including opposed side walls extending between a leading edge and a trailing edge, and the leading edge of the plurality of fins is arranged in a staggered configuration. The gas turbine engine comprises a gearbox assembly configured to transfer rotational energy from the turbine section to the fan, and a mounting assembly for coupling the gearbox assembly to the gas turbine engine, the mounting assembly having a flex coupling configured to mount a first gear of the gearbox assembly to the rotating shaft of the gas turbine engine, a flex mount configured to mount a second gear of the gearbox assembly to the engine static structure, and a fan frame configured to mount a third gear of the gearbox assembly to the engine static structure. Each of the flex coupling and the flex mount is characterized by a lateral impedance parameter ratio, a bending impedance parameter ratio, and a torsional impedance parameter ratio, and wherein the lateral impedance parameter ratio of the flex coupling, the flex mount, or both is less than or equal to 0.5, wherein the bending impedance parameter ratio of the flex coupling, the flex mount, or both is less than or equal to 0.5, and wherein the torsional impedance parameter ratio of the flex coupling, the flex mount, or both is greater than or equal to 0.1.

The gas turbine engine of the preceding clause, wherein the plurality of fins is nested within each other.

The gas turbine engine of any preceding clause, wherein the heat exchanger includes a central peripheral wall positioned radially between the inner peripheral wall and the outer peripheral wall, the central peripheral wall dividing the flow channel such that the central peripheral wall is an inner wall of the flow channel and the inner peripheral wall and the outer peripheral wall are outer walls of the flow channel, and the central peripheral wall extends from approximately an axial center of the flow channel to the outlet and diverges from the axial center to the outlet.

The gas turbine engine of any preceding clause, wherein flow channel includes a non-diverging portion downstream of the diverging portion, and the plurality of fins extends downstream of the diverging portion into the non-diverging portion.

Although the foregoing description is directed to the preferred embodiments, other variations and modifications will be apparent to those skilled in the art, and may be made without departing from the disclosure. Moreover, features described in connection with one embodiment may be used in conjunction with other embodiments, even if not explicitly stated above.

The invention claimed is:

1. A gas turbine engine comprising:
   a fan, a compressor section, a turbine section that includes a rotating shaft, and a combustion section in flow communication with the compressor section and the turbine section;
   an engine static structure;
   a core flow passage in fluid communication with at least one of the compressor section, the turbine section, or the combustion section;
   a heat exchanger comprising:
      an inner peripheral wall and an outer peripheral wall extending between an inlet and an outlet, the inner peripheral wall and the outer peripheral wall defining a flow channel therebetween in fluid communication with the core flow passage; and
      a plurality of fins disposed in the flow channel, the plurality of fins dividing the flow channel into a plurality of flow passages;
   a gearbox assembly configured to transfer rotational energy from the turbine section to the fan; and
   a mounting assembly for coupling the gearbox assembly to the gas turbine engine, the mounting assembly having:
      a flex coupling configured to mount a first gear of the gearbox assembly to the rotating shaft of the gas turbine engine;
      a flex mount configured to mount a second gear of the gearbox assembly to the engine static structure; and a fan frame configured to mount a third gear of the gearbox assembly to the engine static structure, wherein each of the flex coupling and the flex mount is characterized by a lateral impedance parameter ratio, a bending impedance parameter ratio, and a torsional impedance parameter ratio, wherein the lateral impedance parameter ratio of the flex coupling, the flex mount, or both is less than or equal to 0.5, wherein the bending impedance parameter ratio of the flex coupling, the flex mount, or both is less than or equal to 0.5, and wherein the torsional impedance parameter ratio of the flex coupling, the flex mount, or both is greater than or equal to 0.1.

2. The gas turbine engine of claim 1, further comprising a heat transfer structure disposed within at least one of the plurality of fins.

3. The gas turbine engine of claim 1, wherein the plurality of fins varies in radial position as a function of circumferential position.

4. The gas turbine engine of claim 1, wherein the plurality of fins each includes one or more radial perturbations along an exterior surface of the plurality of fins.

5. The gas turbine engine of claim 1, wherein the plurality of fins is nested within each other.

6. The gas turbine engine of claim 1, wherein the heat exchanger includes a central peripheral wall positioned radially between the inner peripheral wall and the outer peripheral wall, the central peripheral wall dividing the flow channel such that the central peripheral wall is an inner wall of the flow channel and the inner peripheral wall and the outer peripheral wall are outer walls of the flow channel.

7. The gas turbine engine of claim 6, wherein the central peripheral wall extends from an axial center of the flow channel to the outlet and diverges from the axial center to the outlet.

8. The gas turbine engine of claim 1, wherein inner peripheral wall and the outer peripheral wall diverge such that the flow channel includes a diverging portion downstream of the inlet.

9. The gas turbine engine of claim 8, wherein the plurality of fins is disposed in the diverging portion.

10. The gas turbine engine of claim 8, wherein the diverging portion has a flow area that is greater than a flow area of the inlet.

11. The gas turbine engine of claim 8, wherein the flow channel includes a non-diverging portion downstream of the diverging portion.

12. The gas turbine engine of claim 11, wherein the plurality of fins extends downstream of the diverging portion into the non-diverging portion.

13. The gas turbine engine of claim 1, wherein each of the plurality of fins includes opposed side walls extending between a leading edge and a trailing edge.

14. The gas turbine engine of claim 13, wherein the leading edge of the plurality of fins is arranged in a staggered configuration.

15. The gas turbine engine of claim 14, wherein the plurality of fins includes a first fin having a first leading edge and a second fin having a second leading edge, and the staggered configuration includes the first leading edge is axially forward of the second leading edge.

16. The gas turbine engine of claim 15, wherein the first fin has a first trailing edge and the second fin has a second trailing edge, the first trailing edge is axially forward of the second trailing edge.

17. A gas turbine engine comprising:
a fan, a compressor section, a turbine section that includes a rotating shaft, and a combustion section in flow communication with the compressor section and the turbine section;
an engine static structure;
a core flow passage in fluid communication with at least one of the compressor section, the turbine section, or the combustion section;
a heat exchanger comprising:
an inner peripheral wall and an outer peripheral wall extending between an inlet and an outlet, the inner peripheral wall and the outer peripheral wall defining a flow channel therebetween in fluid communication with the core flow passage, wherein the inner peripheral wall and the outer peripheral wall diverge such that the flow channel includes a diverging portion downstream of the inlet; and
a plurality of fins disposed in the diverging portion of the flow channel, the plurality of fins dividing the flow channel into a plurality of flow passages, wherein the plurality of fins each includes one or more radial perturbations along an exterior surface of the plurality of fins, each of the plurality of fins including opposed side walls extending between a leading edge and a trailing edge, and the leading edge of the plurality of fins is arranged in a staggered configuration;
a gearbox assembly configured to transfer rotational energy from the turbine section to the fan; and
a mounting assembly for coupling the gearbox assembly to the gas turbine engine, the mounting assembly having:
a flex coupling configured to mount a first gear of the gearbox assembly to the rotating shaft of the gas turbine engine;
a flex mount configured to mount a second gear of the gearbox assembly to the engine static structure; and
a fan frame configured to mount a third gear of the gearbox assembly to the engine static structure,
wherein each of the flex coupling and the flex mount is characterized by a lateral impedance parameter ratio, a bending impedance parameter ratio, and a torsional impedance parameter ratio,
wherein the lateral impedance parameter ratio of the flex coupling, the flex mount, or both is less than or equal to 0.5,
wherein the bending impedance parameter ratio of the flex coupling, the flex mount, or both is less than or equal to 0.5, and
wherein the torsional impedance parameter ratio of the flex coupling, the flex mount, or both is greater than or equal to 0.1.

18. The gas turbine engine of claim 17, wherein the plurality of fins is nested within each other.

19. The gas turbine engine of claim 17, wherein the heat exchanger includes a central peripheral wall positioned radially between the inner peripheral wall and the outer peripheral wall, the central peripheral wall dividing the flow channel such that the central peripheral wall is an inner wall of the flow channel and the inner peripheral wall and the outer peripheral wall are outer walls of the flow channel, and the central peripheral wall extends from an axial center of the flow channel to the outlet and diverges from the axial center to the outlet.

20. The gas turbine engine of claim 17, wherein the flow channel includes a non-diverging portion downstream of the diverging portion, and the plurality of fins extends downstream of the diverging portion into the non-diverging portion.

* * * * *